United States Patent [19]

Lewis et al.

[11] 3,938,101
[45] Feb. 10, 1976

[54] COMPUTER SYSTEM WITH POST EXECUTION I/O EMULATION

[75] Inventors: David O. Lewis; Thomas H. Miller; Steven A. Schmitt, all of Rochester, Minn.

[73] Assignee: International Business Machines Corporation, Armonk, N.Y.

[22] Filed: Dec. 26, 1973

[21] Appl. No.: 428,633

[52] U.S. Cl. .............................................. 340/172.5
[51] Int. Cl.² ......................................... G06F 3/00
[58] Field of Search ...................... 340/172.5; 444/1

[56] References Cited
UNITED STATES PATENTS

| | | | |
|---|---|---|---|
| 3,374,466 | 3/1968 | Hanf et al. | 340/172.5 |
| 3,544,969 | 12/1970 | Rakoczi et al. | 340/172.5 |
| 3,593,300 | 7/1971 | Driscoll, Jr. et al. | 340/172.5 |
| 3,675,214 | 7/1972 | Ellis et al. | 340/172.5 |
| 3,710,328 | 1/1973 | Hunter et al. | 340/172.5 |
| 3,721,961 | 3/1973 | Edstrom et al. | 340/172.5 |
| 3,751,645 | 8/1973 | Brandsma et al. | 444/1 X |

OTHER PUBLICATIONS

Hall, P. H. et al., "Multimode Programmable Machines," IBM Tech. Disc. Bull., Vol. 15, No. 1, June 1972, pp. 243–244.
Tucker, S. G., "Emulation of Large Systems," in Communications of the ACM, Vol. 8, No. 12, Dec. 1965.
Mallach, E. G.; "Emulation: A Survey," in Honeywell Computer Journal, Vol. 6, No. 4, 1972.
Benjamin, R. I., "The Spectra 70/45 Emulator for the RCA 301," in Communications of the ACM, Vol. 8, No. 12, Dec. 1965.
McCormack, M. A. et al., "1401 Compatibility Feature on the IBM System/360 Model 30," in Communications of the ACM, Vol. 8, No. 12, Dec. 1965.

Primary Examiner—Raulfe B. Zache
Attorney, Agent, or Firm—Donald F. Voss

[57] ABSTRACT

A computer system executes instructions for an I/O device not attached to the system. A quasi I/O attachment device is responsive to the commands for the unattached I/O device and generates an interrupt condition. The interrupt condition causes the command instructions for the unattached I/O device to be translated to command instructions for an I/O device connected to the computer system. The I/O device attached to the system performs the designated operation and generates associated I/O device status data. This associated I/O device status data is translated into I/O device status data for the unattached I/O device and thus permits a program for operating an unattached I/O device to operate instead an I/O device attached to the system which otherwise could not be operated by that program. A second embodiment performs the emulation of the unattached I/O device remotely of the central processing unit in the computer system.

17 Claims, 41 Drawing Figures

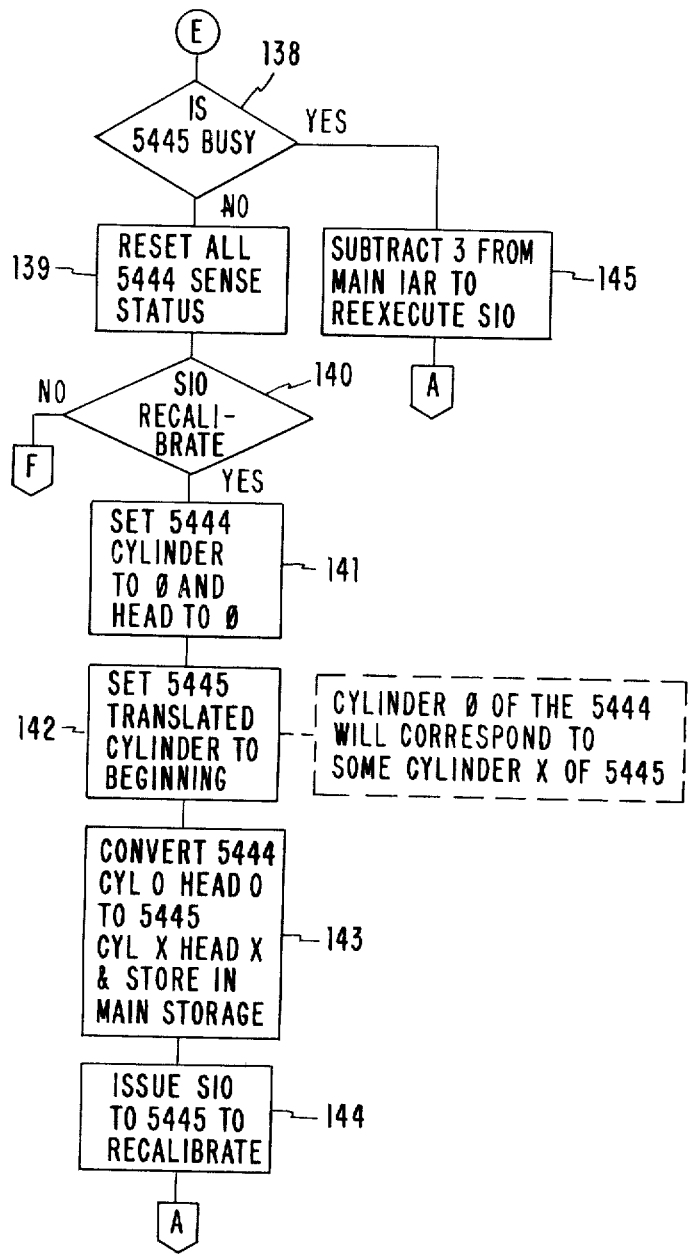
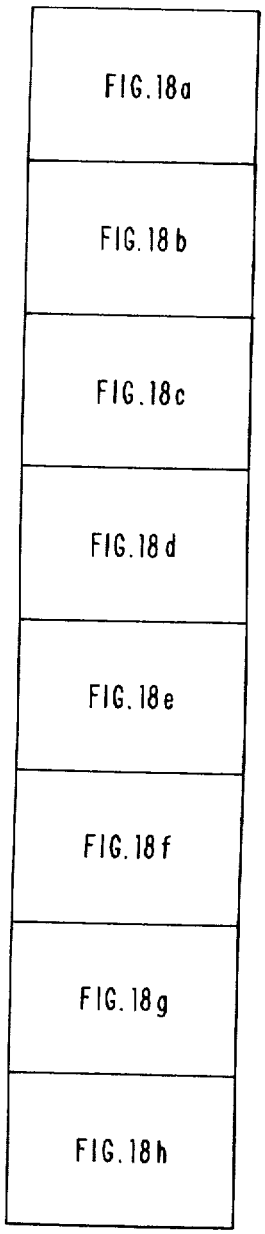
FIG. 3e
FIG. 18

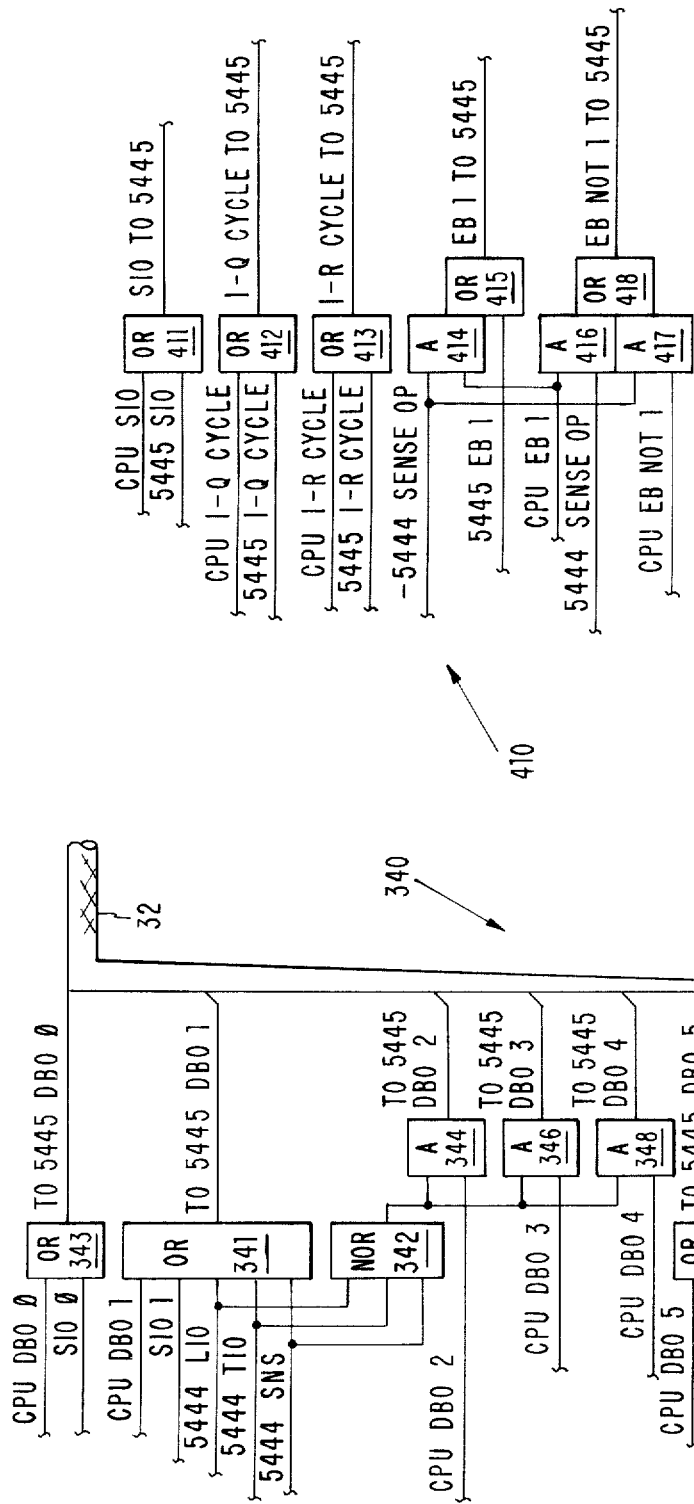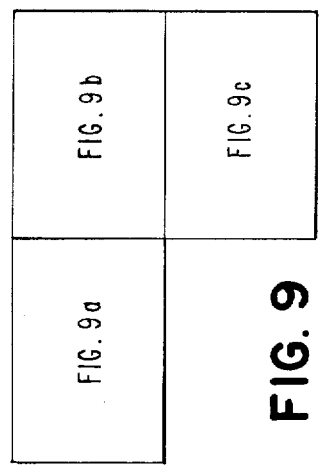

COMPUTER SYSTEM WITH POST EXECUTION I/O EMULATION

BACKGROUND OF THE INVENTION

1. Field of the Invention

This invention relates to computer systems and more particularly to computer systems having the facility to execute instructions for one type of I/O device and cause a different type of I/O device attached to the system to respond.

The invention finds particular utility for attaching higher performance or different I/O devices to a computer system and operating these devices with programming used for lower performance devices no longer attached to the system or I/O devices attached to the system but unavailable for operation because of being temporarily out of service.

Computer systems are originally designed to operate with a particular set of peripheral I/O devices. Then, when higher performance I/O devices come along they also can be attached to the system. However, in some instances, the characteristics of the higher performance I/O devices are such that the programming for them is different from that for the devices already attached to the system. New programs, of course, are written for the newly attached I/O devices but it would also be desirable to run the newly attached I/O devices in place of some of the originally attached I/O devices with the same programming used therefor. The present invention enables this to be done. It also enables a program to run an I/O device having a set of characteristics different from the I/O devices for which it was intended to run. For example, a higher performance disk drive attached to a computer may have a different instruction routine than a disk drive that has been previously attached to the system. The programs for running the disk drive no longer attached to the system are executed in the same manner as if the disk drive were still attached but effect through translation the operation of the higher performance attached disk drive. As another example, the present invention enables the operation of a disk drive; i.e., an I/O device of one class with a program for operating a printer; i.e., an I/O device of a different class. The printer can then be run at a later time after its service has been restored.

2. Description of the Prior Art

The broad concept of the present invention is to operate an I/O device having one personality under control of two different programs. One program is for operating an I/O device having a personality different from the personality of the attached I/O device. The other program is for operating an I/O device having the personality of the attached I/O device. The instructions generated by the program for the I/O device having a different personality are issued and executed as if such an I/O device were attached to the system. A quasi attachment responds to the executed instruction and signals the central processing unit as if an I/O device were attached to it. This causes the central processing unit to identify the type of instruction issued and translate the instruction to a form to operate the I/O device that is attached to the system. The device attached to the system performs the operation and returns status information to the central processing unit. The central processing unit must recognize that this status information must be converted to status information of the I/O device not attached to the system. After the status information is converted, the computer system continues operation in the normal manner.

In the past it has been the practice to have the I/O device attachment respond only to instructions generated by a program specifically for the attached I/O device. The I/O device would not respond to instructions generated by a program for operating an I/O device of a different personality. The cost of reprogramming or redesign of the I/O control units sometimes becomes prohibitive and thus full advantage cannot be taken of the higher performance I/O device. The present invention makes it possible to use the higher performance I/O device to the exclusion of the lower performance I/O device without incurring prohibitive costs.

SUMMARY OF THE INVENTION

The principal objects of the invention are to provide improved apparatus and method of operation for emulating an I/O device which:

a. is relatively inexpensive, b. enables an I/O device to be operated by programs adapted to and not adapted to operate that I/O device, and c. performs the emulation after the instruction for the I/O device to be emulated has been executed.

The objects are achieved in one embodiment by connecting a quasi I/O attachment to the computer system. The quasi attachment responds to the instruction as if there was an I/O device attached and generates an interrupt signal which is sent to the central processing unit. The central processing unit responds to the interrupt signal and causes a translation of the executed instruction to an appropriate command for the attached I/O device. The attached I/O device responds to the command and returns status data to the central processing unit. The central processing unit recognizes that the returned status data is for an I/O device not attached to the computer system and translates the status data to the appropriate form.

In another embodiment of the invention, the emulation of the unattached I/O device is performed remotely of the central processing unit.

DESCRIPTION OF THE DRAWINGS

FIGS. 3a, 3b, 3c, 3d, 3e, 3f and 3g taken together constitute a flow diagram illustrating the steps in emulating the unattached I/O device;

FIG. 9 is a block diagram illustrating the relationship between FIGS. 9a, 9b and 9c;

FIG. 11 is a block diagram illustrating the relationship of FIGS. 11a, 11b and 11c.

FIG. 12 is a schematic logic diagram of the address modify logic in the emulator of FIG. 5;

FIG. 13 is a schematic logic diagram of the tag line modify logic in the emulator of FIG. 5;

DESCRIPTION

Figure 1:
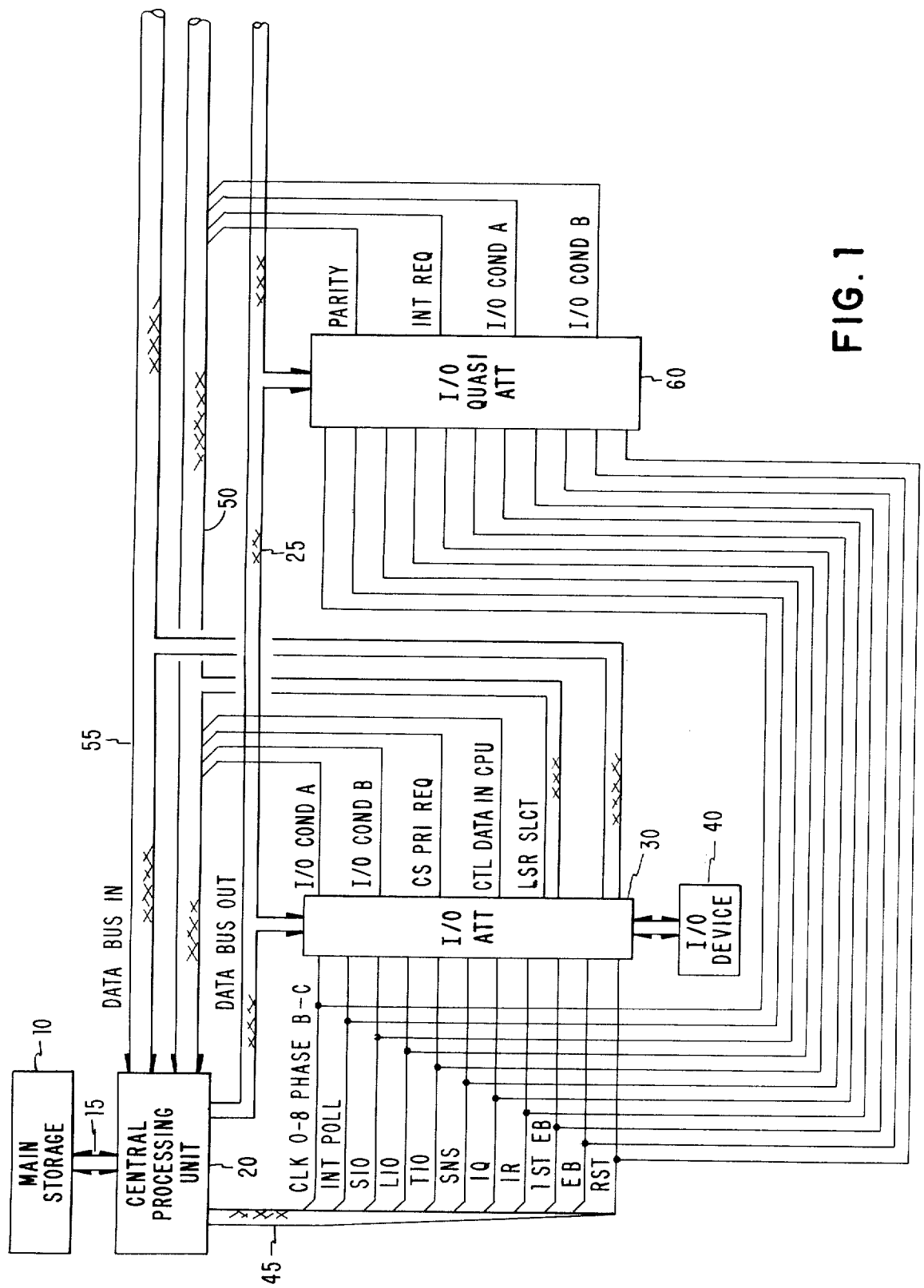
FIG. 1 is a schematic block diagram illustrating the invention incorporated in a computer system.

With reference to the drawings and particularly to FIG. 1, a computer system is shown which is of the type contained in IBM System/3 Model 10 Components Reference Manual GA21-9103-4 and in the 5410 Processing Unit Diagrams SY31-0202-2 both copyrighted by IBM in 1969 and incorporated herein by reference. The computer system includes main storage 10 and central processing unit 20 which is connected to main storage 10 by bus 15. A data bus out (DBO) 25 connects I/O device 40 to the central processing unit 20 via I/O attachment 30. Control signals are provided by central processing unit 20 via bus 45 to the I/O attachment 30 and control signals from I/O attachment 30 are sent back to the central processing unit 20 via bus 50. Data is sent from the I/O attachment 30 to the central processing unit 20 via data bus in (DBI) 55. Normally, additional I/O devices are included in the computer system but are not shown for sake of simplicity.

In this invention, I/O device 40 is operated under control of central processing unit 20 executing programs for an I/O device of a different personality and not attached to the computer system. The central processing unit 20 executes the instructions for the I/O device not attached to the system in a manner as if it were attached to the system. Quasi attachment 60 responds to the executed instruction by returning signals to the central processing unit on bus 50.

Figure 2:
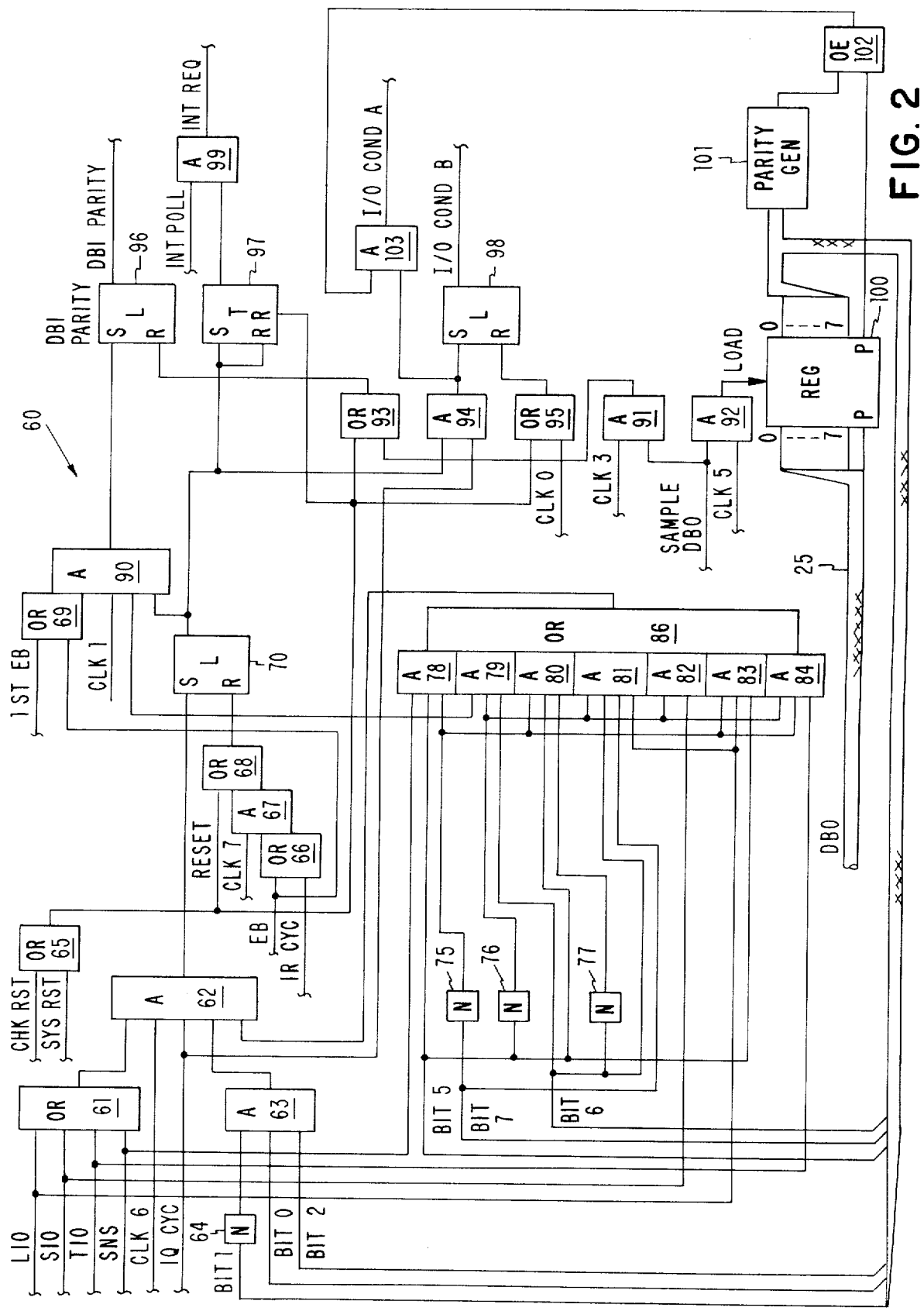
FIG. 2 is a schematic logic diagram of a quasi I/O attachment.
Figure 3A:
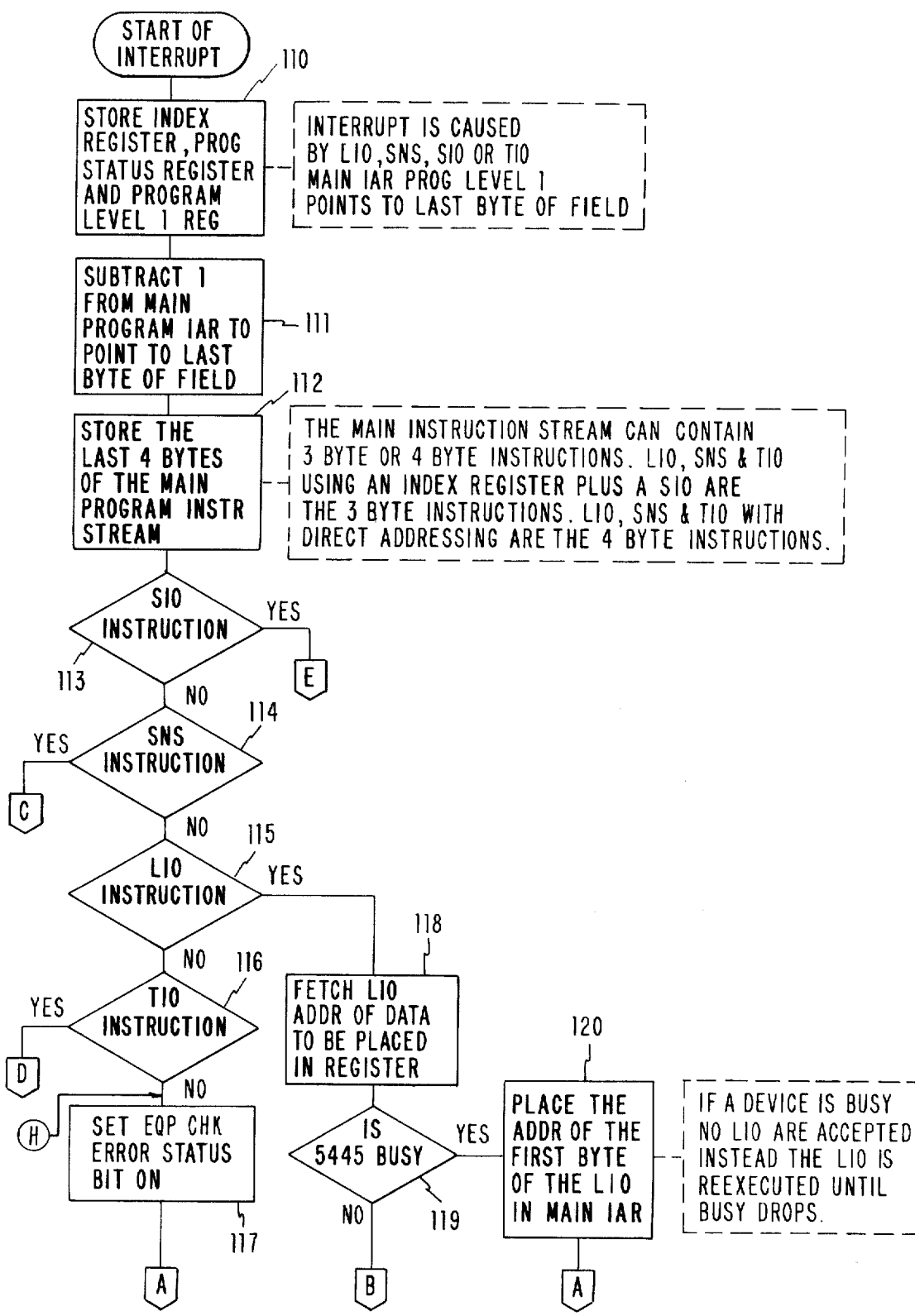
Figure 3B:
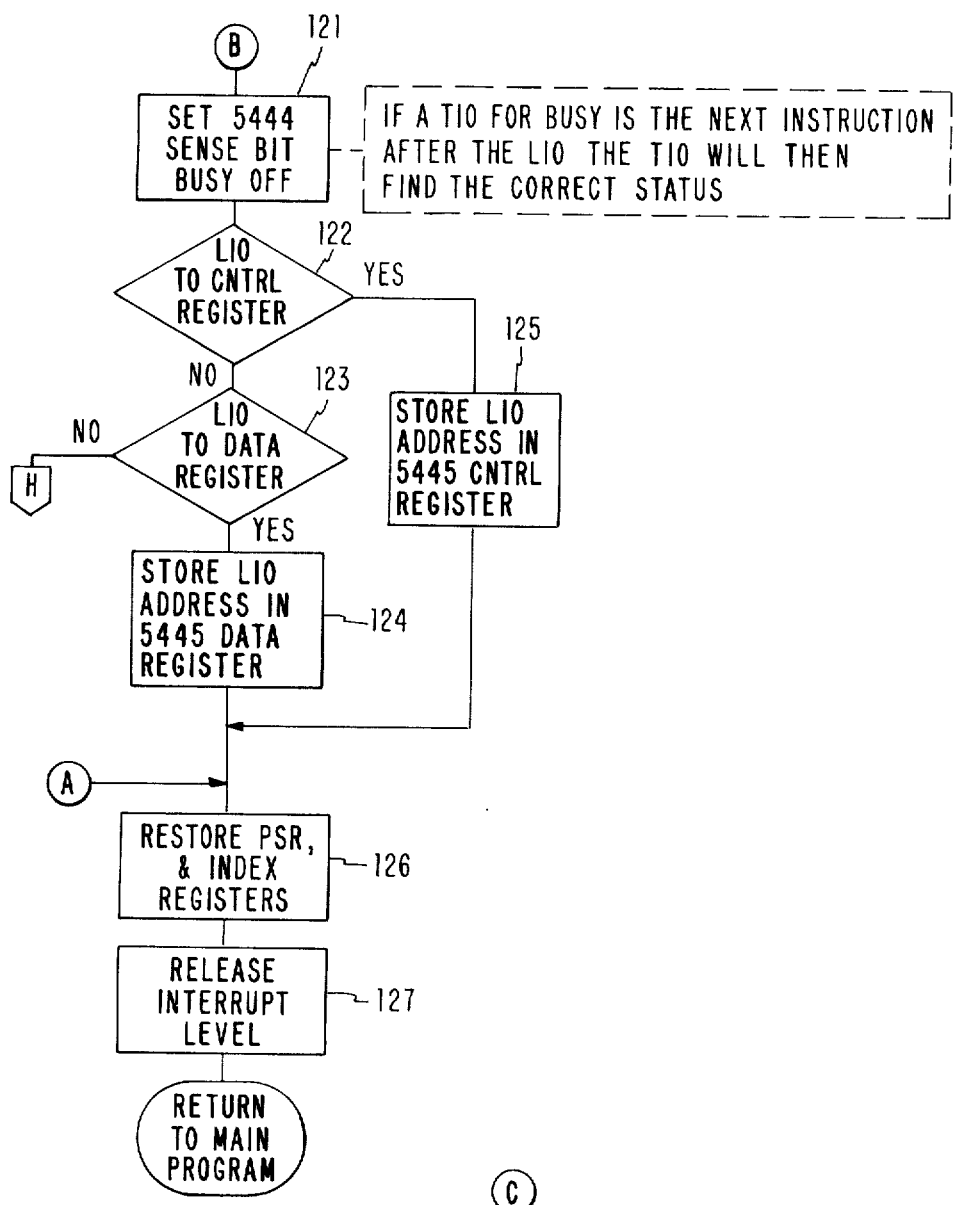
Figure 3C:
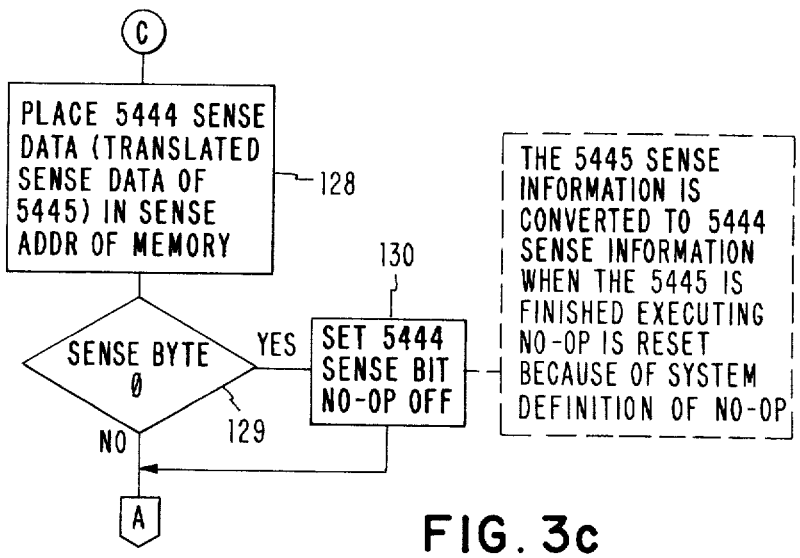
Figure 3D:
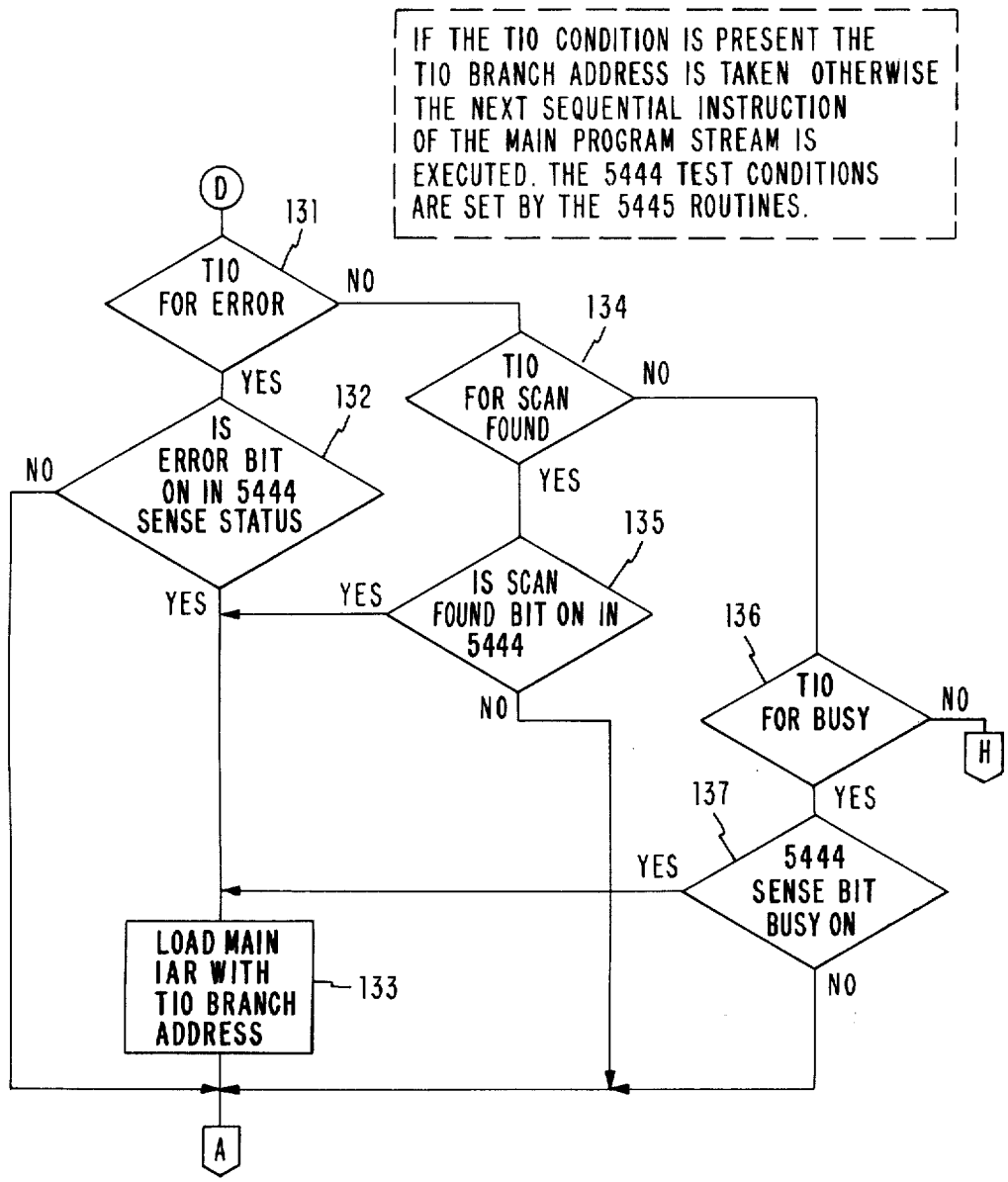
Figure 3F:
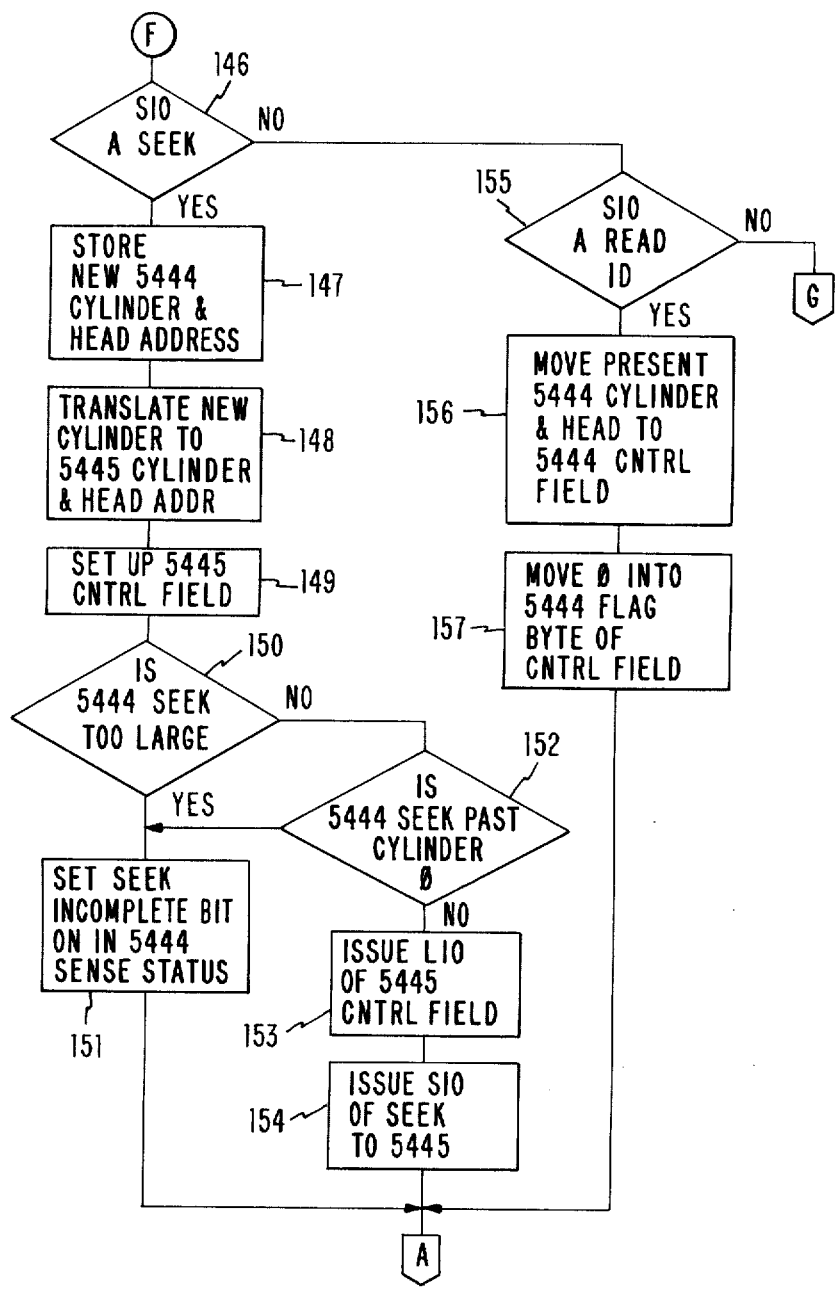
Figure 3G:
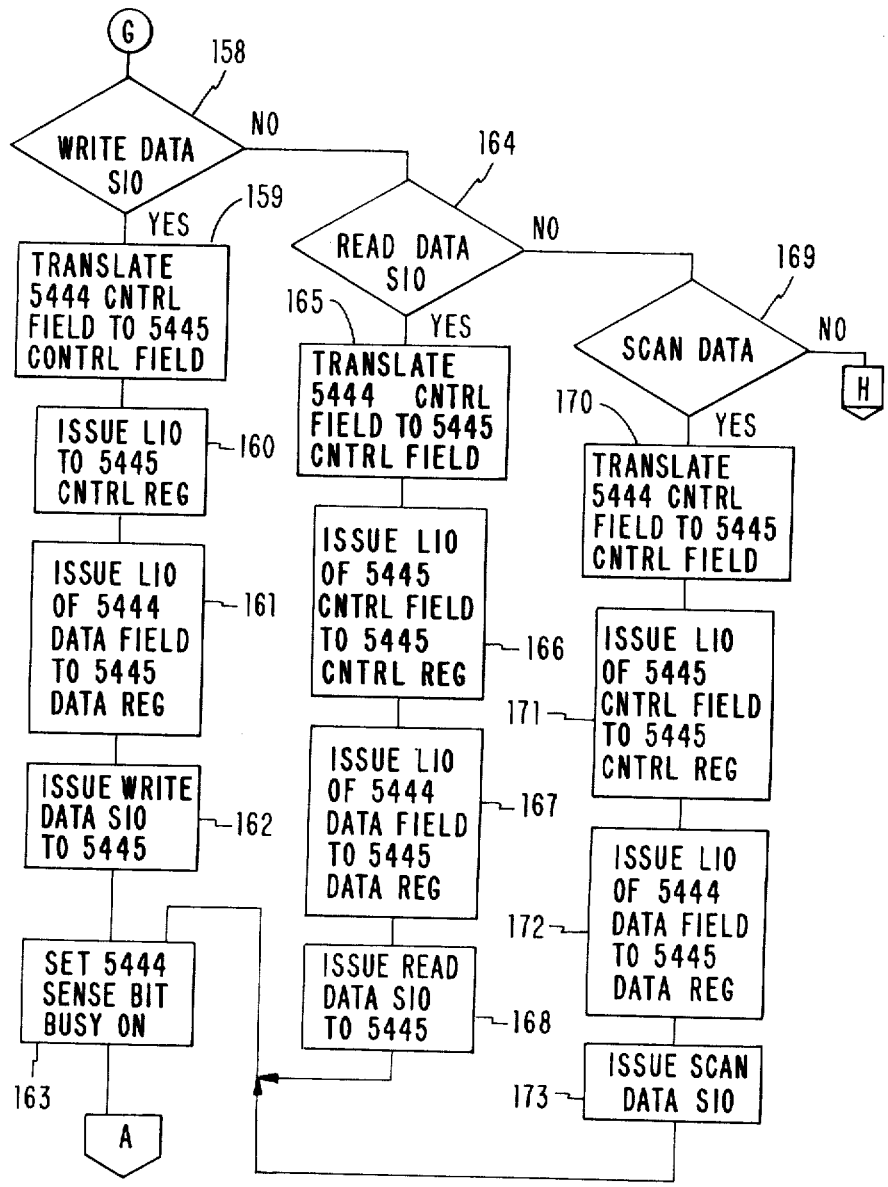

The quasi I/O attachment 60 is shown in detail in FIG. 2 as including OR circuit 61 for receiving LIO, SIO, TIO and SNS signals from CPU 20 via bus 45. The LIO, SIO, TIO and SNS signals are generated when CPU 20 executes corresponding instructions. Execution of instructions takes place as described in the IBM System/3 Model 10 Components Reference Manual incorporated herein by reference. The output of OR circuit 61 is connected to an input of AND circuit 62 which also has inputs for receiving an IQ cycle signal, a clock 6 signal, the output of AND circuit 63 and the output of OR circuit 86. When the inputs to AND circuit 62 are satisfied, latch 70 is set. Latch 70 is used for several purposes including generating the DBI parity signal, the interupt request signal, the I/O condition A signal and the I/O condition B signal.

AND circuit 63 and inverter 64 function to decode the device address. A valid address for the quasi attachment 60 in this instance is the same address as used for the I/O device not attached to the system; i.e., in this instance, an IBM 5444 Disk Storage Drive. The device address for this I/O device is a hexidecimal A or B; i.e., 1010 or 1011. The last bit of the device address specifies drive one or drive two. Hexidecimal A specifies drive 1 and hexidecimal B specifies drive 2. Bits 0, 1 and 2 of the device address in the Q byte come from register 100 which was loaded from DBO 25. Bits 0 and 2 are applied to AND circuit 63 and bit 1 is applied to inverter 64.

Inverters 75, 76, 77; AND circuits 78, 79, 80, 81, 82, 83 and 84 and OR circuit 86 function to determine if the N bits of the Q byte are valid. The Q byte is loaded into register 100 via DBO 25 under control of AND circuit 92 which receives a sample DBO signal and a clock 5 signal. Bits 5, 6 and 7 of register 100 are used together with inverters 75, 76 and 77 for controlling AND circuits 78-84 inclusive which in turn provide inputs via OR circuit 86 for AND circuit 62. The IQ cycle signal and clock 6 signal applied to AND circuit 62 come from the CPU 20 via buss 45.

Latch 70 which is set under control of AND circuit 62 is reset under control of OR circuit 68. OR circuit 68 is fed by OR circuit 65 and AND circuit 67. OR circuit 65 receives a check (CHK) Reset signal and a System (SYS) Reset signal. AND circuit 67 is conditioned by a clock 7 signal and receives the output of OR circuit 66 which in turns receives an IR cycle signal and an EB cycle signal.

The set output of latch 70 is used to set the DBI parity latch 96 via AND circuit 90. AND circuit 90 is conditioned by a SNS signal, a clock 1 signal, and an output signal from OR circuit 69. OR circuit 69 receives an EB cycle signal and a 1st EB cycle signal. The DBI parity latch 96 is reset under control of OR circuit 93 which has inputs for receiving the output of OR circuit 65 and the output of AND circuit 91. AND circuit 91 receives a sample DBO signal and a clock 3 signal.

The set output of latch 70 is also applied to trigger 97. When trigger 97 is set, it develops an interrupt request (INT REQ) signal via AND circuit 99 which is conditioned by the interupt poll (INT POLL) signal coming from the CPU 20 via bus 45.

The I/O condition B signal when present indicates that the addressed I/O device is present or attached to the system. The I/O condition B signal exists when latch 98 is set. Latch 98 is set under control of AND circuit 94 which receives the set output of latch 70 and an IQ cycle signal. Latch 98 is reset under control of OR circuit 95 which receives a clock zero signal and a signal from the output of OR circuit 65.

The output of AND circuit 94 also provides an input to AND circuit 103 for developing the I/O condition A signal. The I/O condition A signal is only present with the I/O condition B signal. When both signals are present, it is indicative of a parity error condition. AND circuit 103 in addition to the input from AND circuit 94 has an input from exclusive OR circuit 102. Exclusive OR circuit 102 functions to compare the parity generated signal from parity generator 101 with the parity signal from register 100. Thus, exclusive OR circuit 102 will not have an output if there is correct parity but will provide a signal to AND circuit 103 if there is incorrect parity.

The output signals from latches 96 and 98 and AND circuits 99 and 103 are applied to the central processing unit 20 via bus 50. From the foregoing it is seen that quasi attachment 60 provides the proper response signals when LIO, SIO, TIO and SNS instructions have been executed for the IBM 5444 disk storage drive.

The interrupt request signal from quasi attachment signal is handled by CPU 20 in a manner shown in FIG. 3. At the start of the interrupt, the CPU 20 interrupts execution of further instructions designated by the interrupted program's instruction address register and proceeds to execute instructions designated by the interrupting level's instruction address register. The interrupted program's instruction address register and address recall register remain intact. The interrupting program stores the index register, the program status register and the program level 1 register as represented by block 110 of FIG. 3a. The main program IAR is decremented by 1 to point to the last byte of the field. This operation is represented by block 111. The last four bytes of the main program instruction stream are stored. This is represented by block 112.

A test is then made to determine if the instruction which had been executed is an SIO instruction. This test is represented by block 113 and if the instruction was a SIO instruction a test is made to determine if the I/O device 40; i.e., the IBM 5445 disk storage drive is busy. This test is represented by block 138. If the I/O device, i.e., the 5445 disk storage drive, is busy, the IAR is decremented by three because the SIO instruction has to be re-executed. This is represented by block 145. The action then following block 145 is common to several blocks and will be described later herein.

If the I/O device 40 is not busy, the sense status information for the unattached I/O device; i.e., the IBM 5444 disk storage drive is reset, as represented by block 139. Block 140 represents a test for determining if the SIO instruction had been a SIO recalibrate instruction. If the SIO instruction were a recalibrate instruction, the cylinder and head address for the unattached I/O device is set to zero as shown in block 141. Next, the translated cylinder is set to the beginning point for the attached I/O device 40, i.e., the 5445 as represented by block 142; i.e., cylinder 0 of the unattached I/O device will correspond to some cylinder X of the attached I/O device. This is followed by converting cylinder 0 for the unattached I/O device to cylinder X for the attached I/O device and storing this data in storage 10 as represented by block 143. This is followed by issuing a SIO instruction to the attached I/O device 40 to recalibrate as represented by block 144.

Had the SIO instruction not been a recalibrate instruction, a test would be made to determine if it were a seek instruction as represented by block 146. If it were a SIO seek instruction, the new cylinder and head address for the unattached I/O device would be stored as represented by block 147. This new cylinder and head address would be translated to a new cylinder and head address for the attached I/O device 40. This is represented by block 148. The control field for the I/O device 40 would be set up as indicated in block 149. A test would then be made to determine if the seek instruction for the unattached I/O device were too large. This test is represented by block 150. If the seek instruction were too large, a seek incomplete bit would be set on in the sense status byte for the unattached I/O device as represented by block 151 and the operation would switch to block 126 for restoring the program status register and the index registers. This step is common to and also follows previously described blocks 144 and 145.

If the seek instruction were not too large, a test would be made to determine if the seek is beyond cylinder 0 as represented by block 152. If the seek were beyond cylinder 0, a seek incomplete bit would be set on in the sense status data for the unattached I/O device. If the seek instruction were not past cylinder 0, a LIO instruction for the attached I/O device 40 control field would be issued. This is represented by block 153. A SIO instruction for a seek would then be issued to I/O device 40 as represented by block 154. The output of block 154 leads to previously described block 126.

If the test made by block 146 indicated that the instruction was not a SIO seek instruction, a test would then be made to determine if it were a SIO Read ID instruction. This test is represented by block 155. If the instruction were a SIO Read ID instruction, the present cylinder and head address for the unattached I/O device would be moved to the control field for that unattached I/O device. This is represented by block 156. A zero is then moved into the flag byte of the control field for the unattached I/O device as represented by block 157. The output of block 157 leads to previously described block 126.

If the instruction had not been a SIO read ID instruction, a test would then be made to determine if it were a SIO Write Data instruction. This test is represented by block 158. If it were a Write Data SIO instruction, the control field for the unattached I/O device; i.e., the IBM 5444 disk storage drive, is translated to the control field for the attached I/O device; i.e., the IBM 5445 disk storage drive. This translation operation is represented by block 159. A LIO command is then issued to the control register for the attached I/O device; i.e., the IBM 5445 as represented by block 160. This is followed by issuing a LIO command for the data field of the unattached I/O device to the data register for the attached I/O device as represented by block 161. Thereafter, a Write Data SIO instruction is issued to the attached I/O device as represented by block 162 and this is followed by setting the unattached I/O device sense bit busy on as represented by block 163. The output of block 163 leads to previously described block 126.

If the instruction had not been a Write Data SIO, a test would then be made to determine if it were a Read Data SIO instruction. This test is made by block 164. If the instruction were a Read Data SIO, the control field of the unattached I/O device would be translated to the control field for the attached I/O device as represented by block 165. Then as seen in block 166, a LIO of the attached I/O device control field would be issued to the control register for the attached I/O device. This would be followed by issuing a LIO of the unattached I/O device data field to the attached I/O device data register as represented by block 167. The next step is to issue a Read Data SIO to the attached I/O device as shown in block 168. The busy sense bit for the unattached I/O device would then be set on as represented by block 163.

If the test for the Read Data SIO in block 164 were negative, a test would be made to determine if the instruction were a Scan Data instruction. This test is made by block 169. If the instruction were a Scan Data instruction, the unattached I/O device control field is translated to the control field of the attached I/O device. This is represented in block 170. A LIO of the attached I/O device control field would be issued to the attached I/O device control register as shown in block 171. Thereafter a LIO of the unattached I/O device data field would be issued to the data register for the attached I/O device as seen in block 172. This would be followed by issuing a Scan Data SIO to the attached I/O device as shown in block 173. The busy sense bit for the unattached I/O device will then be set on as represented by block 163. If the instruction had not been a Scan Data instruction, the operation would step to the previously described block 126.

If the test represented by block 113 indicated that the instruction had not been a SIO instruction, a test would be made by block 114 to determine if it were a SNS instruction. If the instruction had been a SNS instruction, the sense data for the unattached I/O device, i.e., the 5444 which is the translated sense data of the 5445 would be stored in the sense address position in main storage 10. This is represented by block 128. A test is then performed to determine if sense byte 0 has been sensed. This test is represented by block 129. If sense byte 0 has been sensed, the sense bit no-op for the unattached device, i.e., the 5444 is set off. This is represented by block 130. The outputs of blocks 129 and 130 lead to previously described block 126.

If the instruction had not been a SNS instruction, a test would be made by block 115 to determine if it had been a LIO instruction. If the instruction had been a LIO instruction, the address of data to be placed in the data register would be fetched by block 118. A test would then be made to determine if the attached I/O device, i.e., the 5445 is busy. This test is represented by block 119. If the attached I/O device, i.e., the 5445 is not busy, the busy sense bit for the unattached I/O device, i.e., the 5444 is set off as represented by block 121. A test would then be made to determine if a LIO instruction should be issued to the control register. This test is represented by block 122. If a LIO instruction were to be issued to the control register, the LIO address would be stored in the control register for the attached I/O device, i.e., the 5445. This is represented by block 125. On the other hand, if the LIO instruction were not to be issued to the control register, a test would be made to determine if the LIO instruction were to be issued to the data register. This test is represented by block 123. If the LIO instruction were not to be issued to the data register, the operation would switch to the previously described block 126. However, if the LIO instruction were to be issued to the data register, the address for the LIO instruction would be stored in the data register for the attached I/O device, i.e., the 5445. This is represented by block 124. The operation would then switch to the previously described block 126.

If the attached I/O device, i.e., the 5445 were busy, then the address of the first byte of the LIO would be placed in the main IAR as represented by block 120 and the operation would switch to previously described block 126.

If block 115 indicated that the instruction were not a LIO instruction, a test would be made by block 116 to determine if the instruction were a TIO instruction. If the instruction were not a TIO instruction, the file control unit (FCU) error status bit would be set on as represented by block 117 and the operation would switch to previously described block 126. If the instruction were a TIO instruction, a test would be made to determine if the instruction were a TIO error instruction. This test is represented by block 131. If the instruction were a TIO error instruction, a test would then be made by block 132 to determine if the error bit in the unattached I/O device sense status byte is on. If the error bit in the unattached I/O devices sense status bit is not on, the operation switches to previously described block 126. If the error bit in the unattached I/O devices sense status byte is on, the main IAR is loaded with a TIO branch address as represented by block 133 and the operation switches to previously described block 126.

If the instruction were not a TIO error instruction, a test would be made to determine if it were a TIO for seek busy instruction. This test is represented by block 134. If the instruction were a TIO for seek busy instruction, a test would be made to determine if the busy bit of the sense byte for the unattached I/O device is on. This test is represented by block 135. If the busy bit were on, the main IAR is loaded with the TIO branch address as represented by previously described block 133 and the operation switches to previously described block 126. If the busy bit were not on, the operation switches directly to previously described block 126.

If the instruction had not been a TIO for seek busy instruction, a test would be made to determine if the instruction were a TIO for busy instruction. This test is represented by block 136. If the instruction were a TIO for busy instruction, a test would then be made to determine if the busy bit of the sense byte for the unattached I/O device is on. This test is represented by block 137. If the busy bit for the unattached I/O device were on, the main IAR would be loaded with a TIO branch address as represented by previously described block 133. On the other hand, if the busy bit in the sense byte for the unattached I/O device were not on, the operation would switch directly to the previously described block 126.

As previously mentioned, block 126 restores the program status register (PSR) and the index register. This is followed by a release of the interrupt level as represented by block 127 and the operation returns to the main program.

Figure 4:
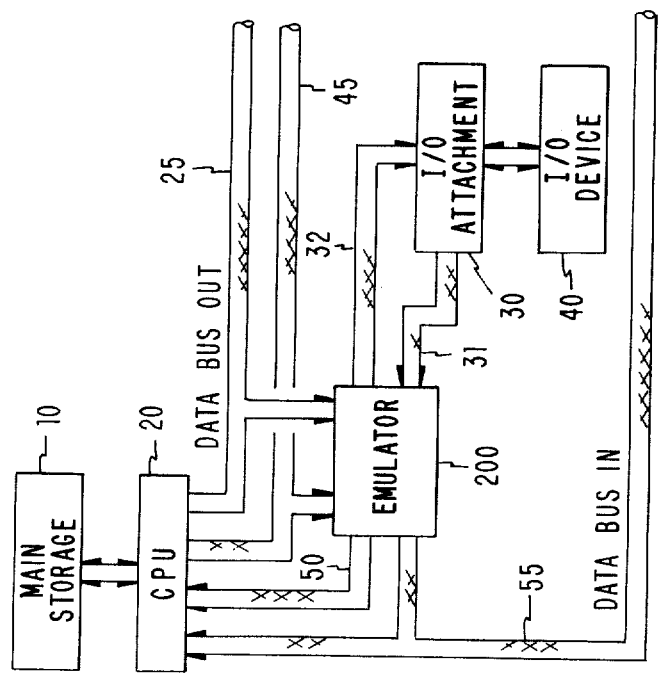
FIG. 4 is a schematic block diagram illustrating another embodiment of the invention where the emulation of the unattached I/O device is performed remotely of the central processing unit.

Another embodiment of the invention is shown in FIG. 4. In this embodiment, emulation of the unattached I/O device is performed remotely of the central processing unit 20. Further in this embodiment, all signals to and from attachment 30 pass through emulator 200. The emulator 200 functions to pass the attached I/O device instructions i.e., the instructions for the 5445 to I/O attachment 30 unchanged and to change instructions for the unattached I/O device, i.e., instructions for the 5444 to instructions for the attached I/O device, i.e., instructions for the 5445.

Figure 5:
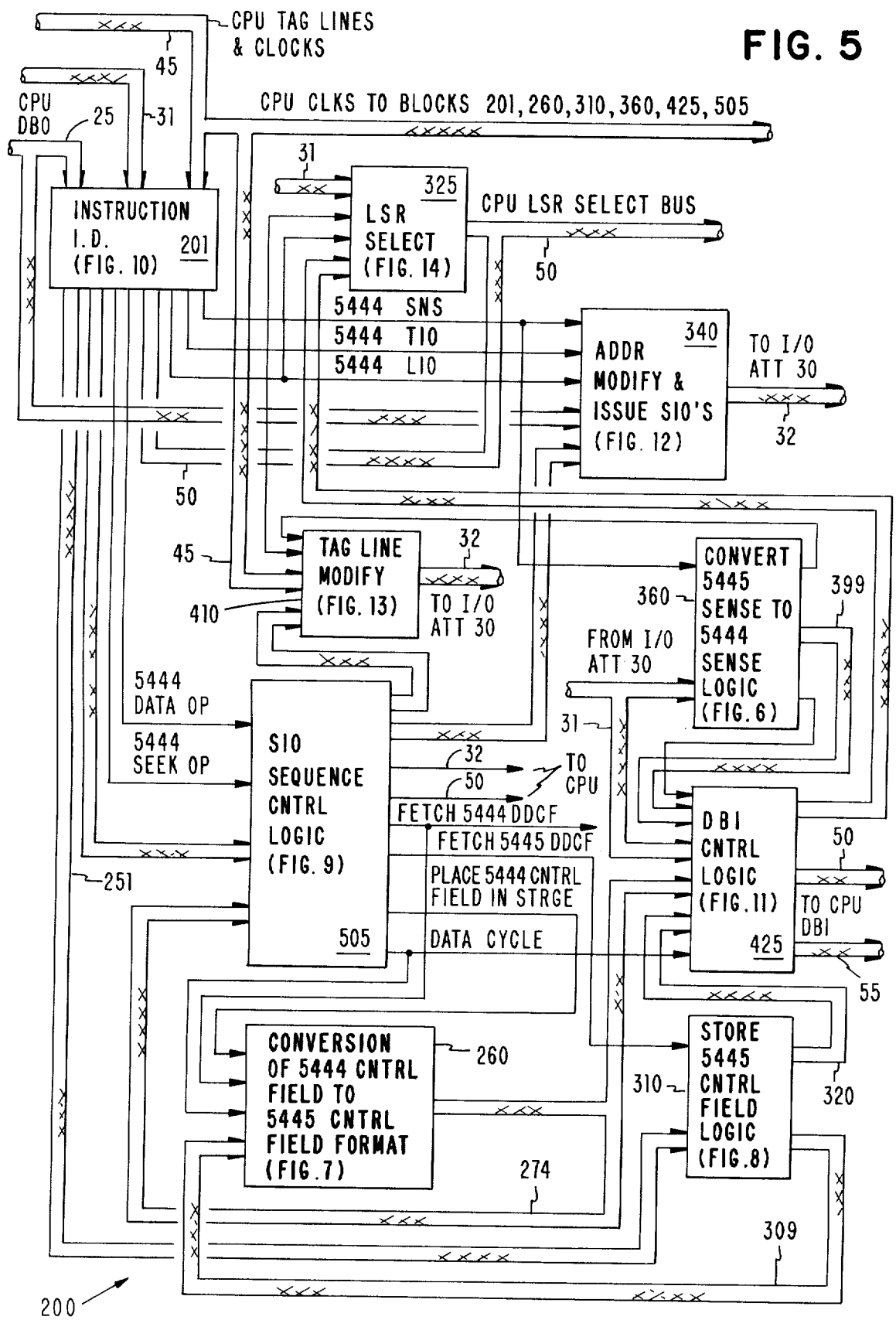
FIG. 5 is a schematic block diagram illustrating the emulator of FIG. 4.

Emulator 200 is shown in block diagram form in FIG. 5. The CPU DBO has 25 connects to blocks 201 and 340 of emulator 200. Block 201 contains the Instruction Identification circuitry. This circuitry is shown in detail in FIG. 10. The test I/O instruction (TIO) for the unattached I/O device, i.e., the 5444 is sent out on DBO 25 and detected by AND circuit 202, FIG. 10a, of the Instruction Identification logic block 201. The output of AND circuit 202 is applied to OR circuit 341 and NOR circuit 342 of the Address Modify and Issue SIO's circuit 340, FIG. 12. AND circuit 202 has an output in response to DBO bits 0, 1 and 2 having bit conditions 1, 0, 1 respectively. The CPU DBO 0 bit is passed by OR circuit 343 unchanged to form the attached I/O device, i.e., the 5445 DBO 0 bit. The 5445 DBO 1 bit becomes a 1 bit as OR circuit 341 passes the output from AND circuit 202. The output of NOR circuit 342 inhibits AND circuits 344, 346 and 348 thereby providing 0 bit conditions for 5445 DBO 2, DBO 3 and DBO 4 bits respectively. The 5445 DBO bits 5, 6 and 7 are the same as the CPU DBO bits 5, 6 and 7 because CPU DBO bit 5 is passed by OR circuit 350, CPU DBO bit 6 is passed by AND circuit 351 and OR circuit 353 respectively, and CPU DBO bit 7 is passed by AND circuit 354 and OR circuit 355 respectively. The 5445 DBO bit lines 0–7 inclusive form 5445 DBO bus 32.

Thus, it is seen that all TIO instructions for the unattached I/O device, i.e., the 5444 are passed to the I/O attachment for the attached I/O device, i.e., the 5445 via emulator 200. Emulator 200 detects the TIO instruction and changes the address from either hexidecimal A or hexidecimal B to hexidecimal C which is the device address for the attached I/O device.

Figure 10A:
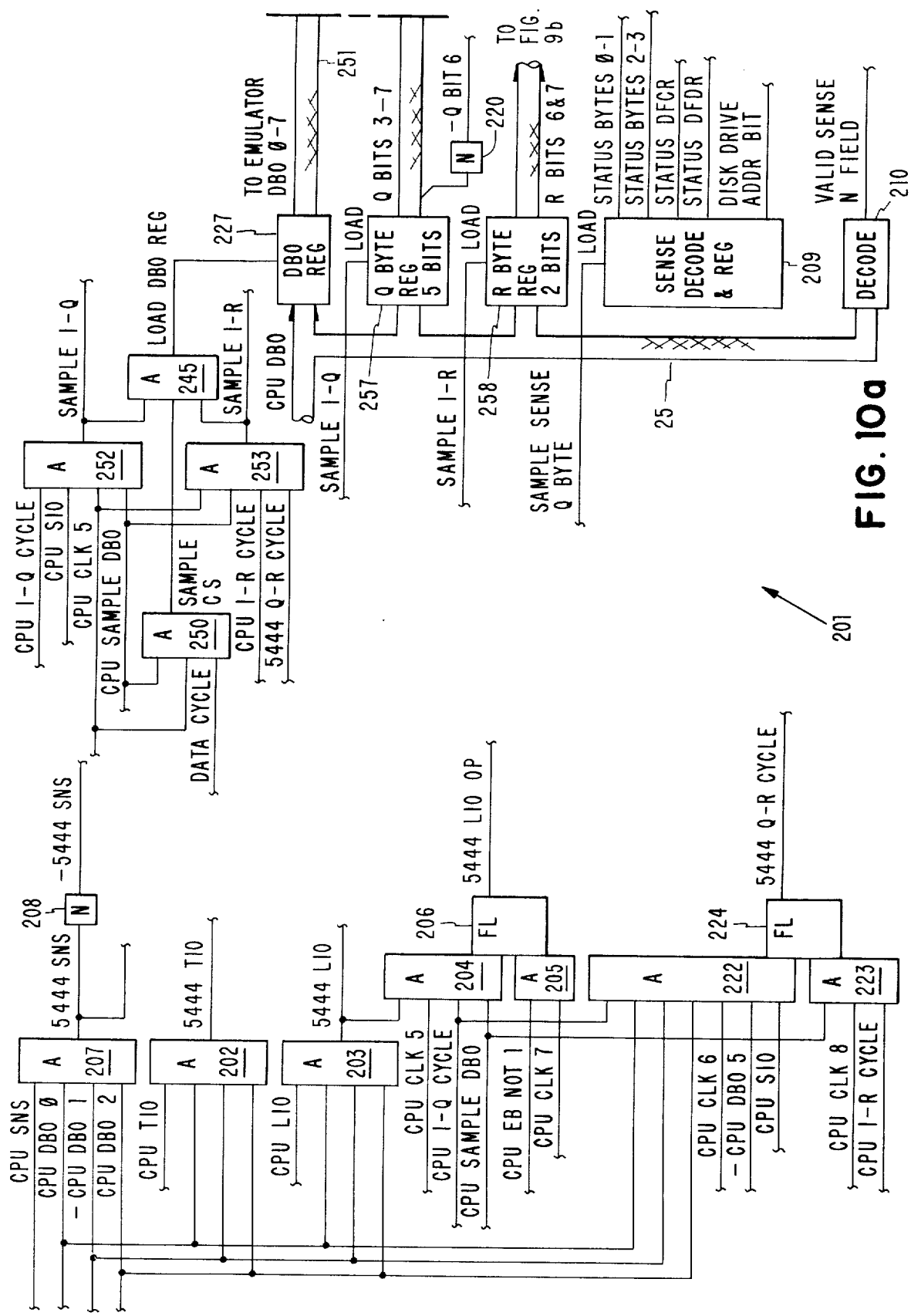
FIGS. 10a and 10b, with FIG. 10a disposed to the left of FIG. 10b, taken together are a schematic logic diagram of the instruction identification logic in the emulator of FIG. 5.

A load I/O instruction (LIO) for the unattached I/O device is detected by AND circuit 203 of the instruction identification logic block 201, FIG. 10a. The output of AND circuit 203 in a manner similar to the output of AND circuit 202 provides an input to OR circuit 341 and NOR circuit 342. This causes the address for the unattached I/O device, i.e., the 5444 to be changed to the address for the attached I/O device, i.e., the 5445 in the same manner as the TIO instruction caused such a change. Additionally, the output of AND circuit 203 is applied to AND circuit 204, FIG. 10a, for setting latch 206 which indicates that a Load I/O (LIO) instruction was issued to the unattached I/O device. Latch 206 is reset upon completion of the execution of the LIO instruction. This reset operation is accomplished via AND circuit 205.

During the execution of the LIO instruction for the unattached I/O device, the responses from I/O attachment 30 are modified to responses for the unattached I/O device, i.e., the 5444. This is accomplished by the LSR select logic block 325, FIGS. 5 and 14. The LSR select three line (LSR SEL 3) from I/O attachment 30, i.e., the I/O attachment for the 5445 is applied to AND circuit 327 and OR circuit 330, FIG. 14. OR circuit 330 provides an LSR select 3 To CPU (LSR SEL 3 to CPU) signal, however, AND circuit 327 provides an LSR select 4 To CPU (LSR SEL 4 To CPU) signal via OR circuit 331. AND circuit 327 requires a 5445 LSR SEL 6 signal from the I/O attachment 30 and an output from OR circuit 326. OR circuit 326 receives the 5444 LIO OP signal from the set output of latch 206, FIG. 10a. The LSR SEL 5 and SEL 6 lines from I/O attachment 30 are applied to AND circuit 329, FIG. 14, which has its output connected to OR circuit 330. AND circuit 329 also receives an input from OR circuit 328. OR circuit 328 has one input connected to receive the 5444 LIO OP signal from latch 206. Thus, a LSR SEL 3 signal from I/O attachment 30 will cause a LSR SEL 3 signal to be issued to the CPU. Similarly, the combination of LSR SEL 5 and LSR SEL 6 signals from I/O attachment 30 cause a LSR SEL 3 signal to the CPU. However, LSR SEL 3 and LSR SEL 6 signals from I/O attachment 30 cause a LSR SEL 4 signal to the CPU. It should be also noted that the output of latch 206 is applied to NOR circuit 334 and thus AND circuit 335 does not issue a LSR SEL 6 signal to the CPU.

One of the functions of a sense instruction is to sense the contents of the LSR just loaded by a LIO instruction. A sense instruction (SNS) for the unattached I/O device, i.e., the 5444 is identified by AND circuit 207, FIG. 10a. The output of AND circuit 207 is applied to OR circuit 341 and NOR circuit 342, FIG. 12, 342 and this causes the DBO bits for the 5445 to change in a manner similar to that for the LIO and TIO instruction. However, a NOT 5444 sense signal from the output of inverter 208, FIG. 10a, is applied to AND circuits 351 and 354, FIG. 12, to force the 5445 DBO 6 and 7 bits, i.e., the outputs of OR circuits 353 and 355 to a zero bit condition respectively.

The Q byte of the sense instruction (SNS) is sent over DBO 25 and decoded by logic block 209, FIG. 10a, which includes logic for decoding the bits within the Q byte and storing the decoded results in a register. The logic of block 209 is similar to that shown in the IBM System 3 5444 Disk Storage Drive Attachment Manual SY34-0021-1 copyrighted by International Business Machines Corporation, 1970, incorporated herein by reference. This manual contains the logic for developing the Status bytes 0–1 line, Status bytes 2–3 line, Status DFCR line, and Status DFDR line. The Disk Drive Address Bit line is developed by logic 209 so as to indicate which drive of the unattached I/O device, i.e., drive of the unattached I/O device, i.e., drive A or B is being sensed.

Decode block 210, FIG. 10a, receives bits from the Q byte over DBO 25 to determine if the sense instruction (SNS) is a valid one. Logic block 210 is similar to the logic block in the IBM System 5444 Disk Storage Drive Attachment Manual referred to above for detecting a valid sense (SNS) instruction.

When sensing the status bytes, 0, 1, 2 and 3 of the attached I/O device, i.e., the 5445, it is necessary to convert their format into the format for the unattached I/O device, i.e., the 5444. However, in order to sense the converted status bytes at the proper time, it is necessary to force I/O attachment 30 to provide the status bytes for the attached I/O device early in time.

Figure 6A:
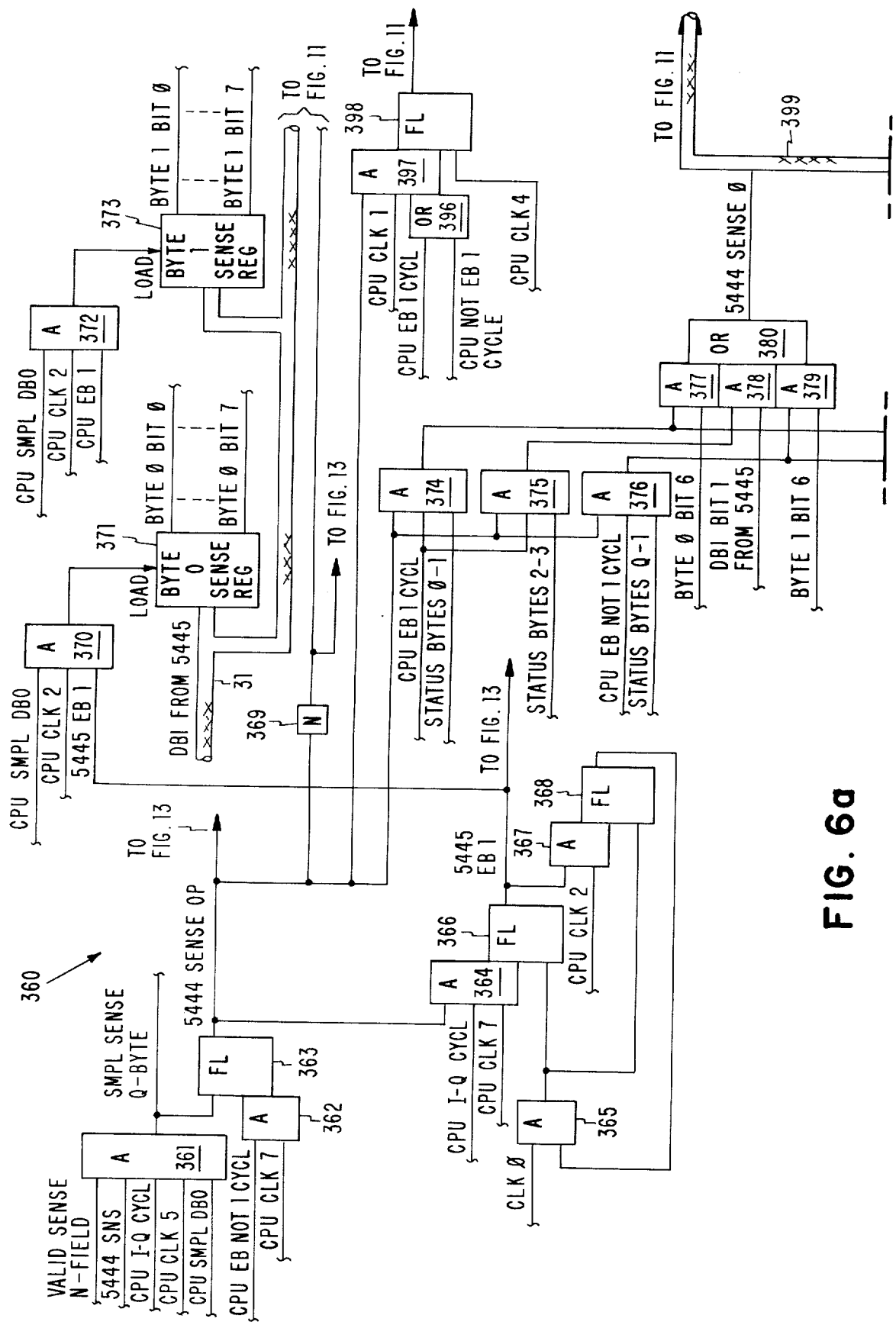
FIGS. 6a and 6b, with FIG. 6a disposed on top of FIG. 6b, taken together are a schematic logic diagram of the convert 5445 sense to 5444 sense logic in the emulator of FIG. 5.

The status bytes 0 and 1 are loaded in registers 371 and 373 respectively, FIG. 6a, under control of AND circuits 370 and 372 respectively. Normally the status byte zero is sent to the CPU at CPU EB1 time and status byte 1 is sent to the CPU at CPU EB not one (EB1)time. However, in this instance, the I/O attachment 30 for the 5445 is going to be asked to send the status bytes 0 and 1 early. The status byte 0 is sent early by the I/O attachment 30 in response to a EB1 To 5445 signal passed by OR circuit 415 of the Tag Line Modify logic 410, FIG. 13. The EB1 To 5445 signal is initiated by the output of latch 366 of the Convert 5445 sense To 5444 Sense logic 360, FIG. 6a.

Latch 366 is set by AND circuit 364 which receives the CPU I-Q Cycle signal, the CPU Clock 7 signal and the set output of latch 363 which is set by a signal from AND circuit 361. AND ciircuit 361 provides an output signal in response to a Valid Sense N-Field signal from Decode logic 310, FIG. 10a, a 5444 SNS signal from AND circuit 207, a CPU I-Q Cycle signal from CPU 20, a CPU clock 5 signal from CPU 20 and a CPU sample DBO signal from CPU 20.

The I/O attachment 30 for the 5445 responds to the EB1 To 5445 signal by sending status byte 0 over bus 31 to register 371. Since latch 366 is set, AND circuit 370 loads the status byte 0 into register 371 at CPU clock 2 time when CPU Sample DBO is present.

Figure 6B:
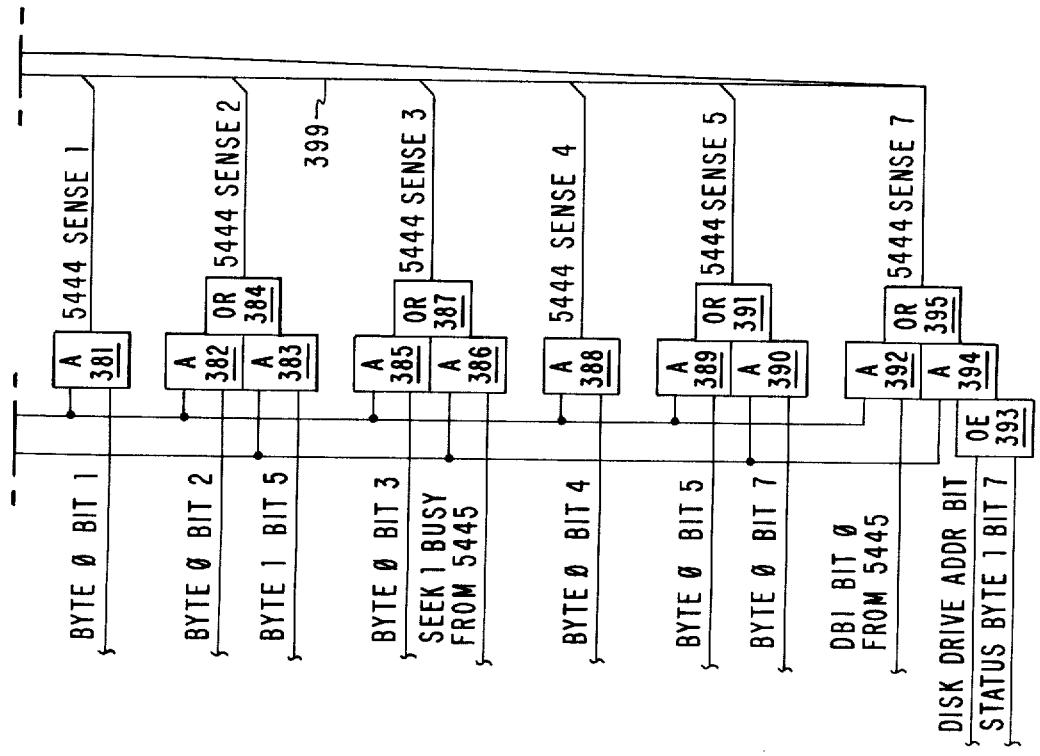

Status byte 1 is fetched from I/O attachment 30 during The CPU EB1 cycle. The CPU EB1 signal is applied to AND circuits 414 and 416, FIG. 13. AND circuit 414 is not conditioned at this time because it is inhibited by the signal from inverter 369, FIG. 6a, which inverts the output of latch 363. Latch 363 is still set because the CPU EB not one (CPU $\overline{EB1}$) signal comes at the end of the sense operation, i.e., right after the EB1 signal. However, AND circuit 416 is conditioned by the 5444 Sense Op signal from latch 363. The output of AND circuit 416 is passed by OR circuit 418 as a EB Not 1 To 5445 signal. This signal is passed to I/O attachment 30 which responds by returning the status byte 1 over bus 31 to register 373, FIG. 6a. The status byte 1 is set into register 373 via a signal from AND circuit 372 which receives the CPU EB1 signal, the CPU Clock 2 signal and the CPU Sample DBO signal. At CPU EB1 time, the status byte 0 in register 371 is examined to form the status byte 0 for the unattached I/O device, i.e., the 5444. The bit outputs 6, 1, 2, 3, 4, 5 and 7 of register 371 are applied to AND circuits 377, 381, 382, 385, 388, 389 and 390 respectively, FIGS. 6a and 6b. These AND circuits are conditioned by the output of AND circuit 374, FIG. 6a, which passes a signal in response to receiving a 5444 Sense Op signal from latch 363, a CPU EB1 Cycle signal from the CPU 20 and a Status Bytes 0-1 signal from Sense Decode logic 209, FIG. 10a. The outputs from AND circuits 377, 381, 382, 385, 388, 389 and 392; which are all conditioned at this time by the output of AND circuit 374, are passed to 5444 Sense bus 399. The outputs of AND circuit 377, 382, 385 and 389 are passed to bus 399 by OR circuits 380, 384, 387 and 391 respectively. The outputs of AND circuits 381 and 388 are passed directly to the bus 399. The output of AND circuit of 392 is passed to bus 399 via OR circuit 395. However, it should be noted that AND circuit 392 receives it's bit input directly from the I/O attachment 30 bia bus 31.

Figure 11A:
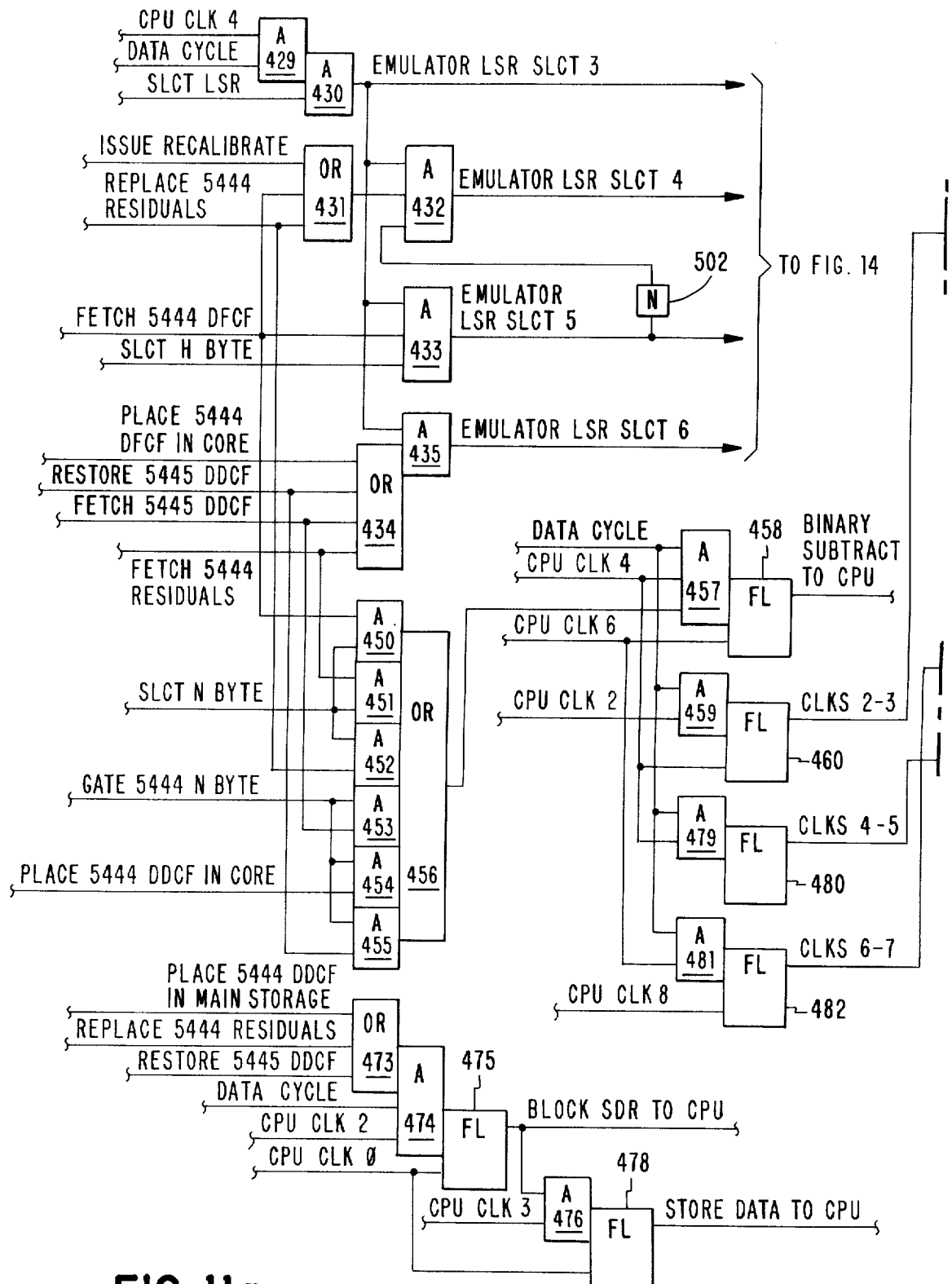
FIGS. 11a, 11b and 11c taken together are a schematic logic diagram of the Data Bus In (DBI) control logic in the emulator of FIG. 5.
Figure 11B:
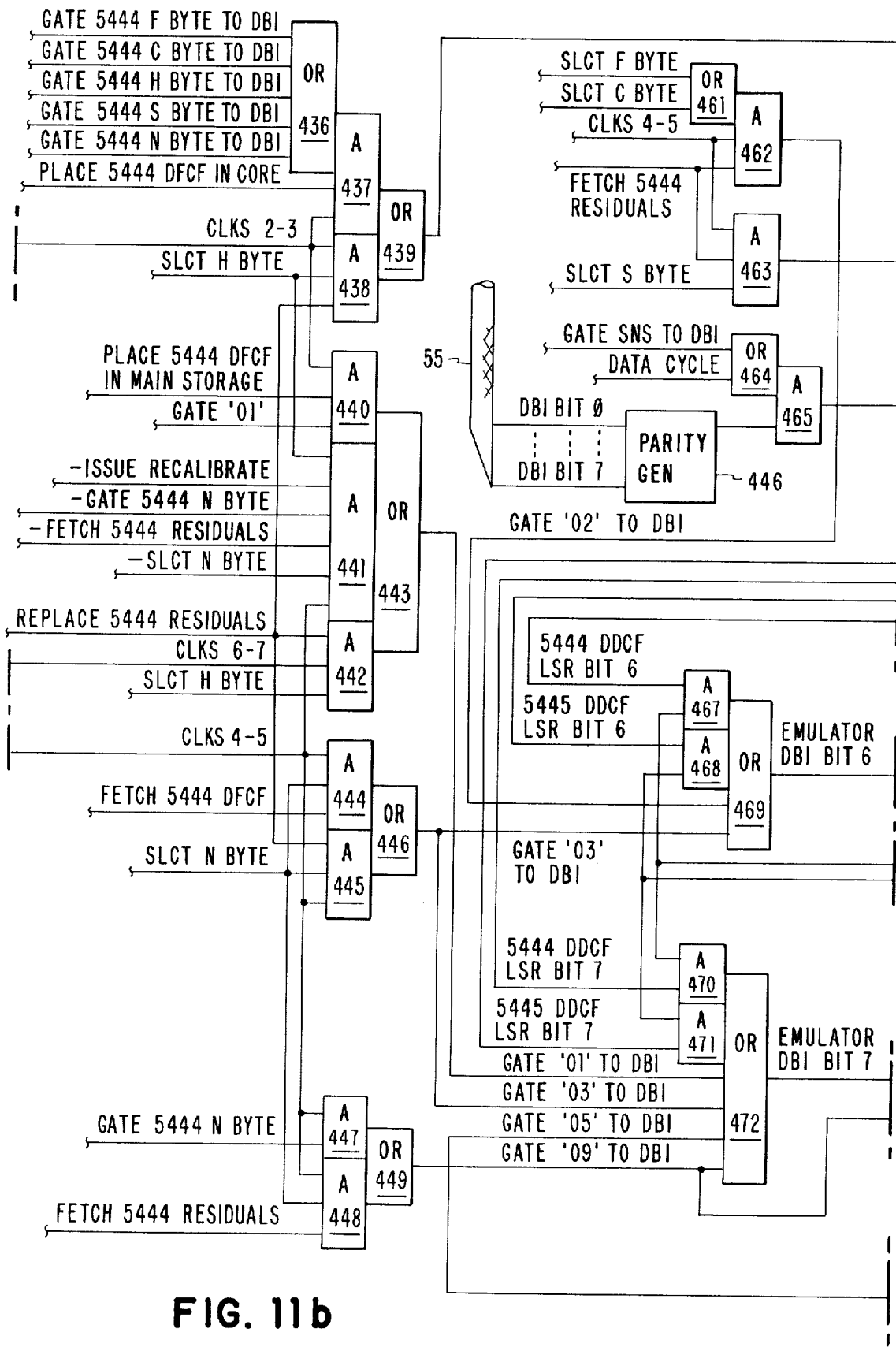

The data on bus 399 is gated via AND circuit 426 and OR circuit 428, FIG. 11b, to Data Bus In (DBI) 55. AND circuit 426 is representative of a plurality of AND circuits therebeing one AND circuit for each bit forming bus 399. These AND circuits, i.e., AND circuit 426 are gated by the set output of latch 398, FIG. 6a. Latch 398 is set when the conditions of AND circuit 397 are met. AND circuit 397 receives the set output of latch 363, a CPU Clock 1 signal and the output of OR circuit 396 which has inputs for receiving the CPU EB1 cycle signal and the CPU Not EB1 cycle signal. Latch 398 is reset by CPU clock 4 time and thus its output is up from CPU clock 1 time of either the CPU EB1 cycle or the CPU Not EB1 cycle until clock 4 time.

It should be also noted that when the attached I/O device, i.e., the 5445 is operating under control of 5445 instructions, the data on bus 31 from I/O attachment 30 is gated to the DBI bus 55 via AND circuit 427, FIG. 11b, which is representative of a plurality of AND circuits there being one AND circuit for each bit forming the bus 31. These AND circuits are conditioned by a Not 5444 Sense Op signal from inverter 369, FIG. 6a. In this instance, the clocking for putting the data on DBI bus 55 is done by the I/O attachment 30.

It is thus seen that when the I/O attachment 30 returns the status byte 0 from the attached I/O device, i.e., the 5445 this status byte is then converted into a status byte 0 for the unattached I/O device, i.e., the 5444. Namely, bit 0 of status byte 0 is not used to form the status byte 0 for the 5444. Bits 1, 2, 3, 4 and 5 of status byte 0 for the 5445 becomes bits 1, 2, 3, 4 and 5 of status byte 0 for the 5444. Bit 6 of status byte 0 for the 5445 becomes bit 0 of status byte 0 for the 5444. Bit 6 of the status byte 0 for the 5444 is always 0 because no logic is provided to change this bit condition. Bit 7 of the status byte 0 for the 5444 is formed from bit 0 of status byte 1 of the 5445.

Status byte 1 for the 5444 is generated under control of AND circuit 376, FIG. 6a, which has inputs similar to AND circuit 374 except it is being controlled by CPU EB Not 1 Cycle rather than CPU EB1 Cycle. CPU EB Not 1 cycle follows immediately after CPU EB1 cycle. The output of AND circuit 376 conditions AND circuits 379, 383, 386, 390 and 394. AND circuits 379, 383, 386 and 390 receive bit 6 of status byte 1, bit 5 of status byte 1, a Seek 1 Busy signal from attachment 30 and bit 7 of status byte 0 respectively. AND circuit 394 receives the output of exclusive OR circuit 393 which has inputs for receiving the Disk Drive Address Bit signal from logic 209 of the Instruction Identification logic block 201, FIG. 10a and bit 7 of status byte 1. Thus, if bit 7 of status byte 1 and the Disk Drive Address Bit are both 1's or 0's, bit 7 of status byte 1 becomes a 0 for the 5444. By this logic arrangement, it is seen that bit 6 of status byte 1 of the 5445 becomes bit 0 of status byte 1 for the 5444. Bits 1, 4 and 6 of status byte 1 for the 5444 are always 0 because no logic is provided to change their bit condition. Bit 2 of status byte 1 of the 5444 is formed from bit 5 of status byte 1 for the 5445. Bit 3 of status byte 1 for the 5444 is developed by the I/O attachment 30. Bit 5 of status byte 1 for the 5444 is formed from bit 7 of status byte 0 of the 5445. Status byte 1 of the 5444 is put onto DBI bus 55 in the same manner as status byte 0 for the 5444 except in this instance, the CPU Not EB1 cycle signal is conditioning AND 397 via OR circuit 396.

Status byte 2 for the unattached I/O device, i.e., the 5444 is formed under control of AND circuit 375, FIG. 6a which has its output connected to AND circuit 378. AND circuit 378 receives bit 1 from I/O attachment 30, i.e., the 5445 attachment. AND circuit 375 is gated by the CPU EB1 cycle and the Status Bytes 2-3 signal from Sense Decode logic 209. All other bits for status byte 2 of the 5444 are 0. This status byte 2 is gated onto DBI bus 55 via AND circuits 426. Status byte 3 for the 5444 is gated onto DBI bus 55 at CPU Not EB1 cycle time. The bits forming status byte 3 for the 5444 are all 0's due to the absence of any logic for changing the bit conditions of the bit lines forming bus 399.

In this instance, the attached I/O device 40, i.e., the 5445 and the unattached device, i.e., the 5444 both are responsive to start I/O command (SIO) for initiating one of four operations, i.e., a seek operation, a read operation, a write operation or a scan operation. Emulator 200 groups the read, write and scan operations into a category designated data operations. AND circuits 215 and 216, FIG. 10b, together with latch 217 determine if the SIO instruction is a seek instruction for the unattached I/O device, i.e., the 5444. AND circuit 215 receives the 5444 Q-R cycle signal, a Not DBO PC signal, a CPU I-R cycle signal, a Valid Seek signal, a CPU clock 6 signal and a Not 5445 seek busy signal. The output of AND circuit 215 sets latch 217 which then indicates that the operation is a 5444 seek operation.

The Valid Seek signal is formed by AND circuit 218 which has inputs for receiving the Not Q bit 6 signal from inverter 220, FIG. 10a, and the Not Q bit 7 signal from inventer 221. The 5444 Q-R cycle signal is formed by AND circuits 222, 223 and latch 224, FIG. 10a. AND circuit 222 functions to decode the address, of the 5444 during the CPU I-Q cycle. Thus AND circuit 222 has inputs including a CPU I-Q cycle signal, a CPU Clock 6 signal, a CPU DBO 0 bit signal, a CPU DBO Not 1 bit signal, a CPU DBO 2 bit signal, a CPU DBO Not 5 bit signal and a CPU SIO signal. The output of AND circuit 222 sets latch 224. When latch 224 is set, it provides a 5444 Q-R Cycle signal. Latch 224 is reset under control of AND circuit 223. AND circuit 223 has inputs for receiving a CPU I-R Cycle signal, a CPU Clock 8 signal and a CPU Sample DBO signal.

The Not DBO PC (parity check) signal comes from inverter 225. This signal is present whenever parity check block 226 does not detect a parity error. The CPU I-R cycle signal and the CPU Clock 6 signal come from CPU 20 and the Not 5445 Seek Busy signal comes from I/O attachment 30.

Figure 10B:
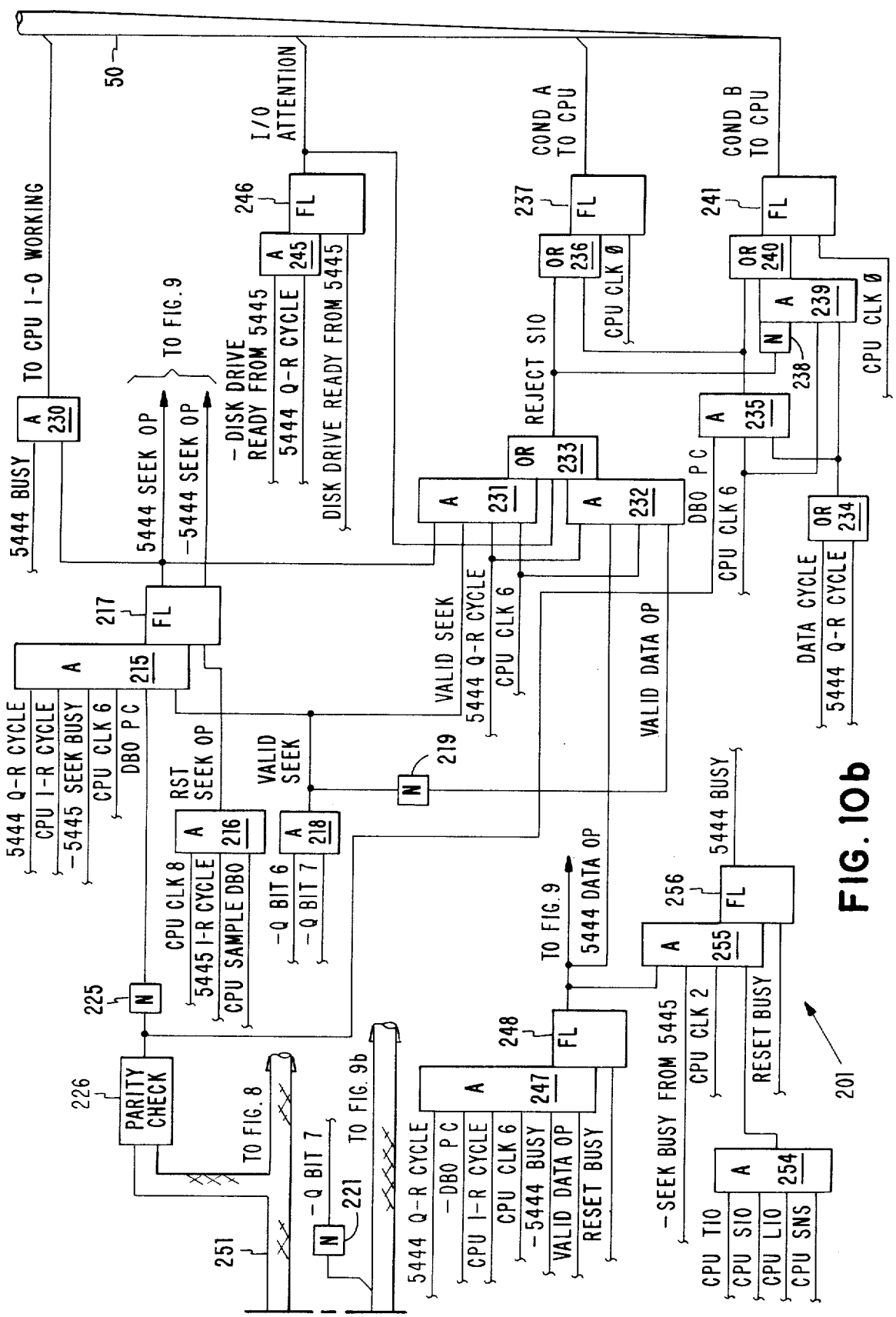

During the time that the 5444 seek operation signal is being generated by setting 217, FIG. 10b, appropriate responses are being generated to the CPU via bus 50. The 5444 Seek Op signal is passed to bus 50 via OR circuit 230. The Valid Seek signal from AND circuit 218 is applied to AND circuit 231 which also receives a 5444 Seek Op signal from latch 217, a CPU Clock 6 signal and a 5444 Q-R cycle signal from latch 224. The output of AND circuit 231 is passed to OR circuit 133 as a Reject SIO signal.

OR circuit 233 also receives an I/O Attention signal from latch 246. Latch 246 is set under control of AND circuit 245 and reset by a Disk Drive Ready signal from I/O attachment 30, i.e., the 5445. It should be noted that the I/O attention signal from latch 246 is also passed to bus 50. OR circuit 233 also receives the output of AND circuit 232 which has inputs for receiving a Valid Data Op signal from inverter 219, a 5444 Data Op signal from latch 248, a 5444 Q-R cycle signal from latch 224 and a CPU clock 6 signal. The output of OR circuit 233 is used for generating Condition A and Condition B signals which are placed on bus 50.

The Condition B signal as previously described, indicates that there is no parity error. The Condition B signal is present when latch 241 is set. Latch 241 is set by the output of OR circuit 240 which has inputs from AND circuit 235 and 239. AND circuit 235 receives a DBO PC signal from parity check block 226, a CPU Clock 6 signal and the output of OR circuit 234. AND circuit 239 receives a Not Reject SIO signal from inverter 238, a CPU Clock 6 signal and the output of OR circuit 234. OR circuit 234 receives a Data Cycle signal from the SIO Sequence Control Logic block 505, FIG. 9, and a 5444 Q-R cycle signal from latch 224. The Condition B signal is present together with a Condition A signal to indicate a parity error condition and is present with the absence of a Condition A signal to indicate that there is an I/O device present which will execute the command. Latch 237 is set under control of OR circuit 236 to provide an I/O Condition A signal to bus 50. OR circuit 236 receives the Reject SIO signal from OR circuit 233 and the parity error signal from AND circuit 235. Latches 237 and 241 are both reset by a CPU Clock 0 signal.

Thus the appropriate responses have been generated and sent back to the CPU via bus 50. The 5444 Seek Op signal from latch 217 is sent to the OR circuit 506 of the SIO Sequence Control Logic 505, FIG. 9c. The output of OR circuit 506 is applied to AND circuit 507 which has its output connected to set latch 508. The output of latch 508 is a Fetch 5444 Disk File Control Field (DFCF) signal which causes four cycles to be taken for fetching the four bytes forming the disk file control field. AND circuit 506 which sets latch 508 also has inputs for receiving a CPU Clock 7 signal, a CPU I-R Cycle signal and a 5444 Q-R Cycle signal.

OR circuit 506 also receives a 5444 Data Op signal. Latch 508 is reset with a 5444 DFCF Fetched signal. The set output of latch 508 is applied to AND circuit 509 which also receives a CPU Clock 7 signal and a CPU Sample DBO signal. The output of AND circuit 509 feeds OR circuit 510 which has its output connected to set latch 511. Latch 511 is used for generating a Cycle Request signal and this signal together with a CPU clock 6 signal generates a Cycle Steal Request Line 3 To CPU signal via AND circuit 512.

The Cycle Steal Request Line 3 To CPU signal is applied to the CPU via bus 50. The CPU 20 responds with a CPU clock 8 signal, a CPU DBO bit 3 signal and CPU DBO parity bit signal which are detected by AND circuit 513 indicating that the next cycle is an I/O cycle for the emulator 200.

Figure 11C:
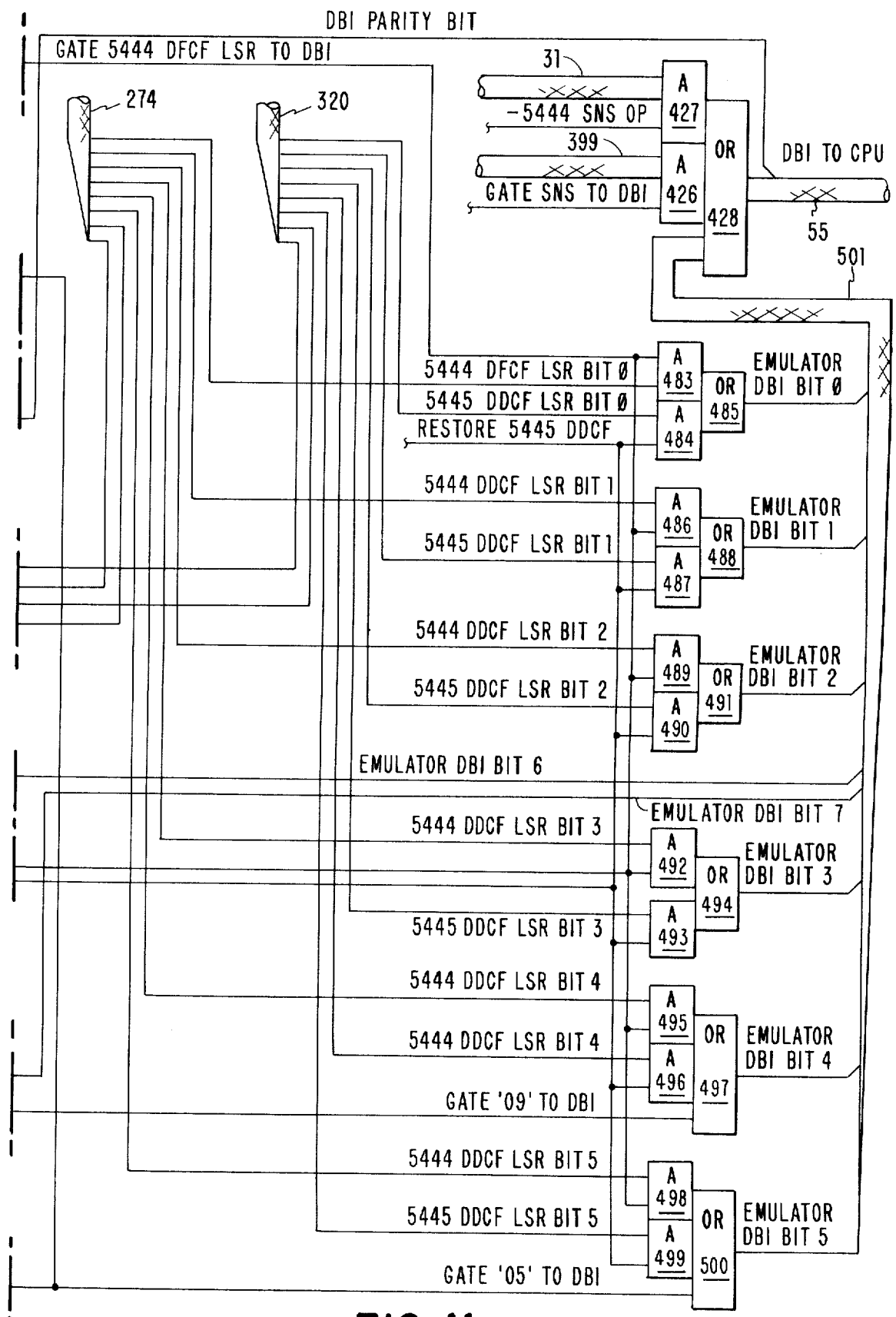

The output of AND circuit 513 is a Select LSR signal which is applied to OR circuit 430 of the DBI control logic FIG. 11. The output of OR circuit 430, FIG. 11c, conditions AND circuit 432, 433 and 435 and is also passed to bus 50 via OR circuit 330 of the LSR Select logic block 325, FIG. 14. In addition to sending back the emulator LSR Select 3 signal to the CPU, OR circuit 430 conditions AND circuit 432 to send an emulator LSR Select 4 signal to the CPU via OR circuit 331 and bus 50 shown in FIG. 14.

Figure 9A:
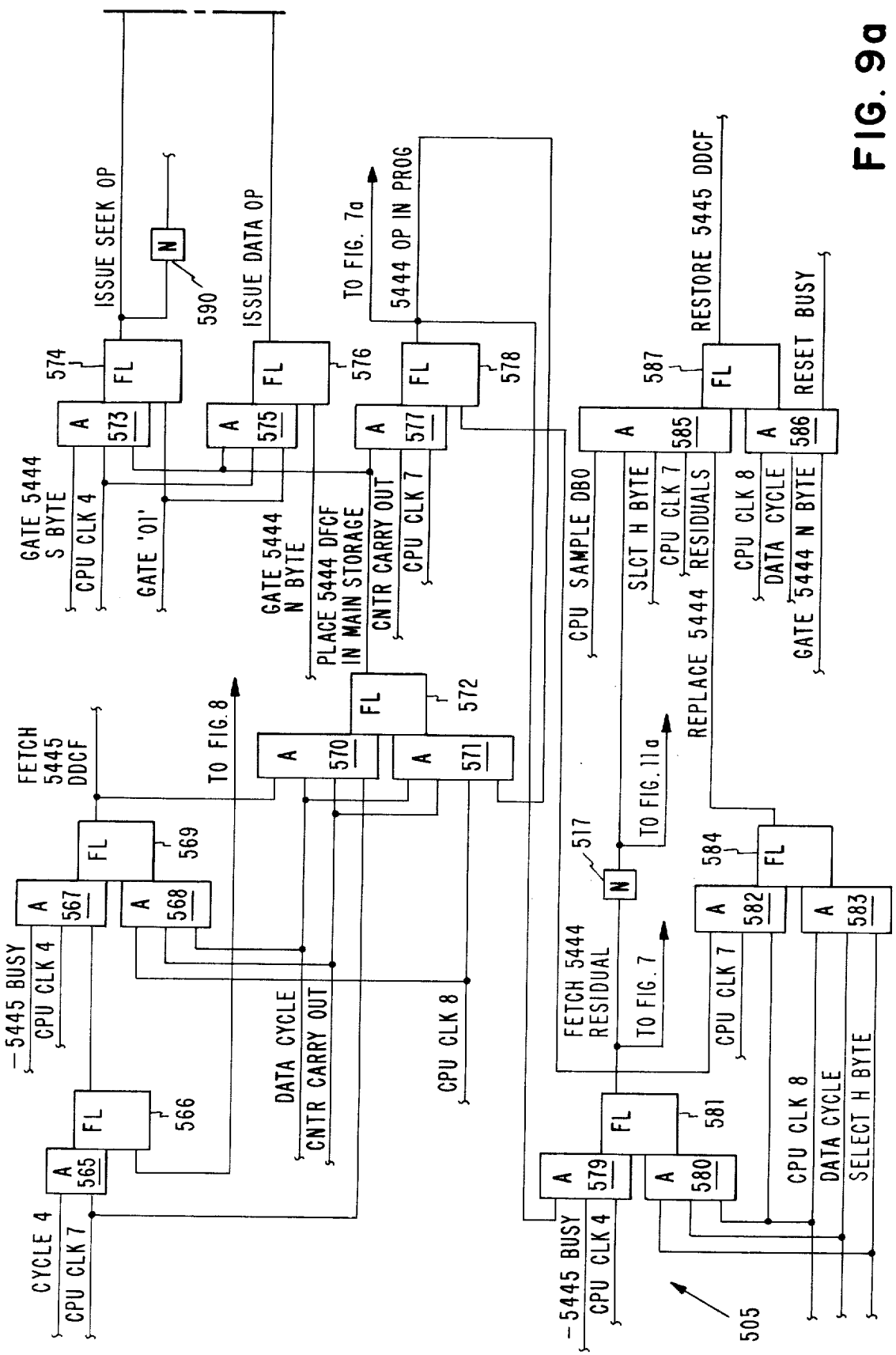
FIGS. 9a, 9b and 9c taken together are a schematic logic diagram of the SIO operation sequence control logic in the emulator of FIG. 5.
Figure 9B:
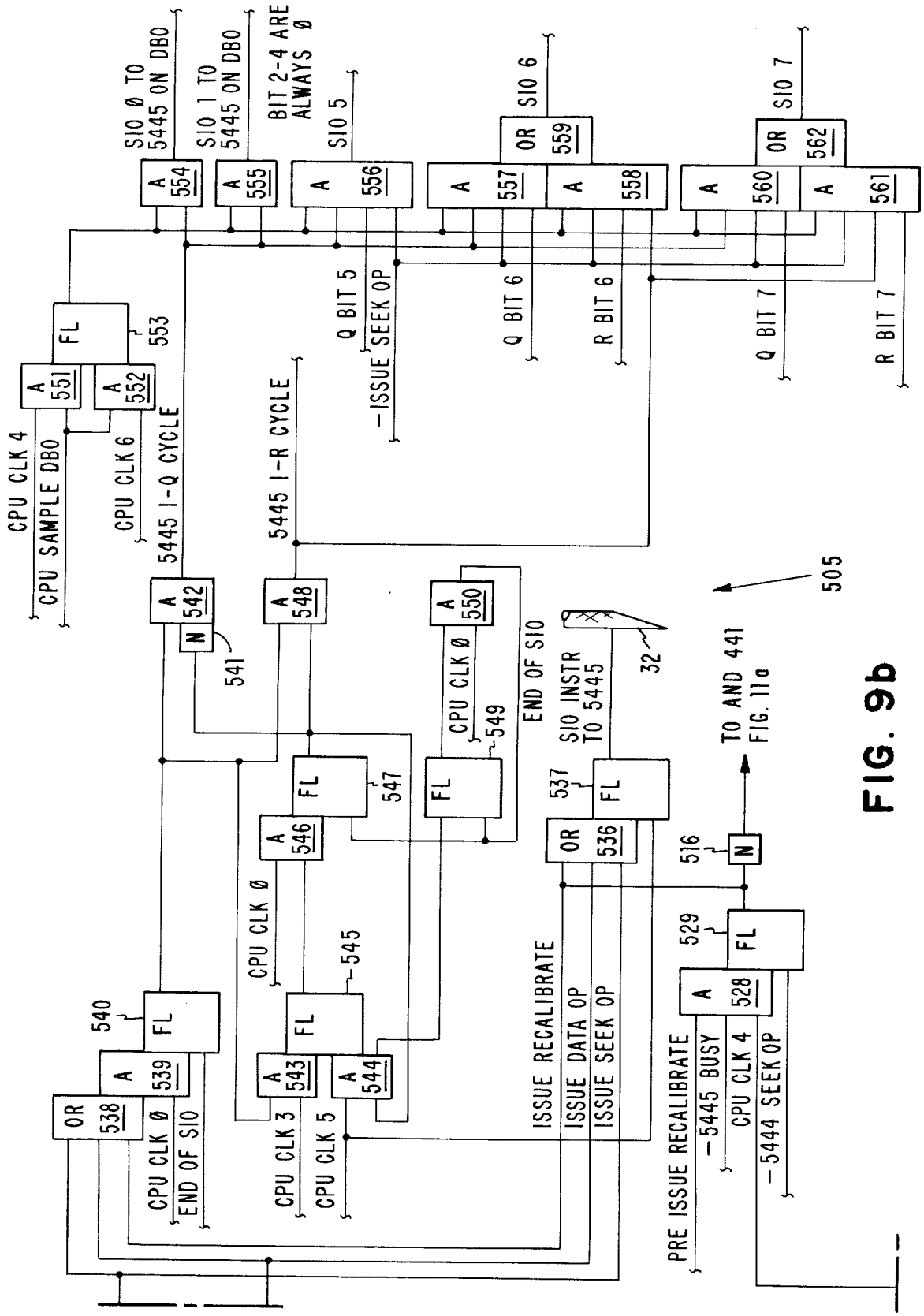
Figure 9C:
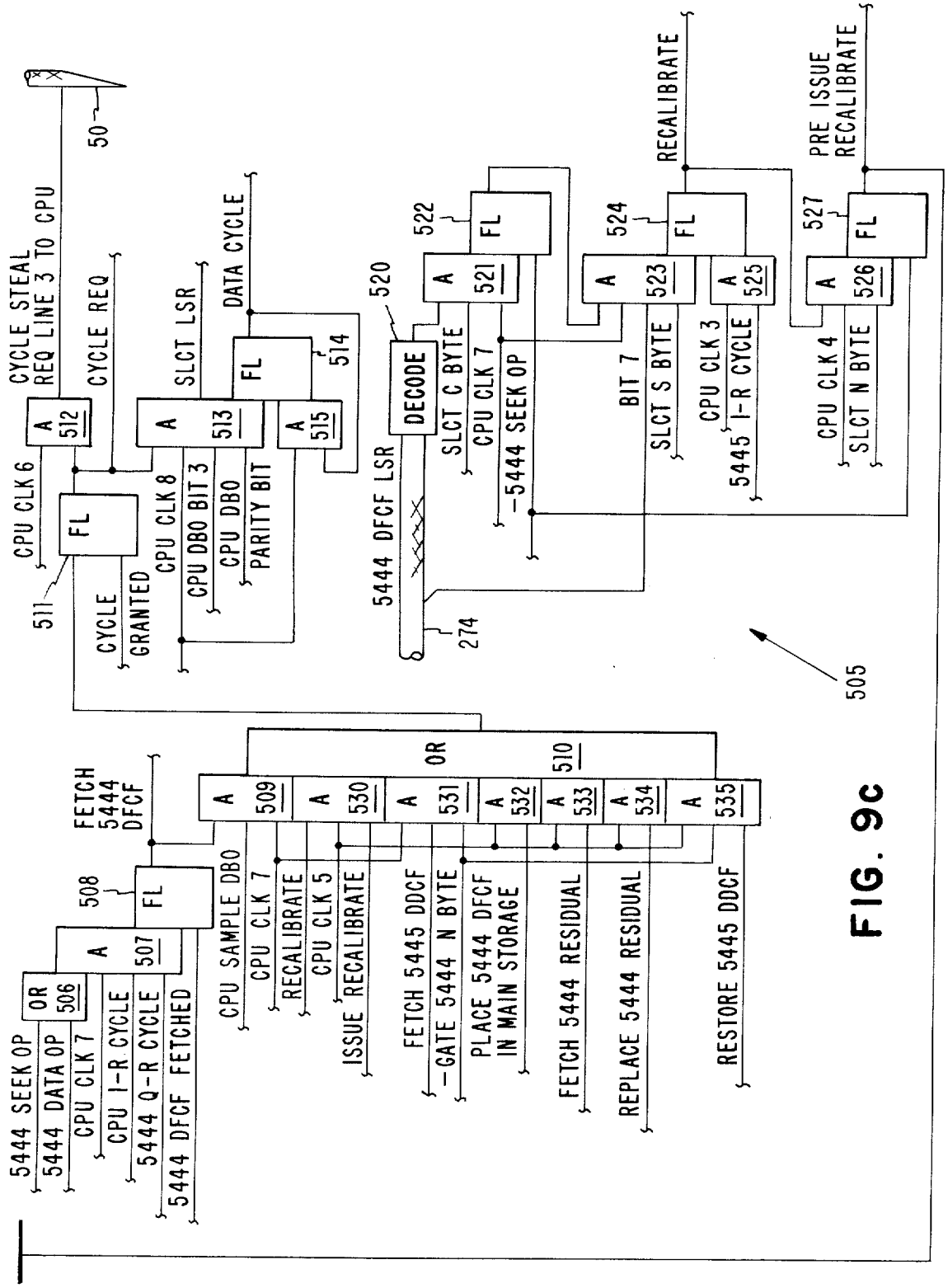

AND circuit 432 receives the output of OR circuit 431 which at this time is receiving a Fetch 5444 DFCF signal from Latch 508, FIG. 9c. The CPU responds by placing a byte of data on data bus out DBO 25 which is loaded into DBO register 227, FIG. 10a, under control of AND curcuit 245 which at this time is receiving a sample C. S. signal from AND circuit 250. AND circuit 250 has inputs for receiving a CPU Clock 5 signal, a CPU Sample DBO signal and a Data Cycle signal from latch 514, FIG. 9c, which was set with the select LSR signal from AND circuit 513.

Figure 7A:
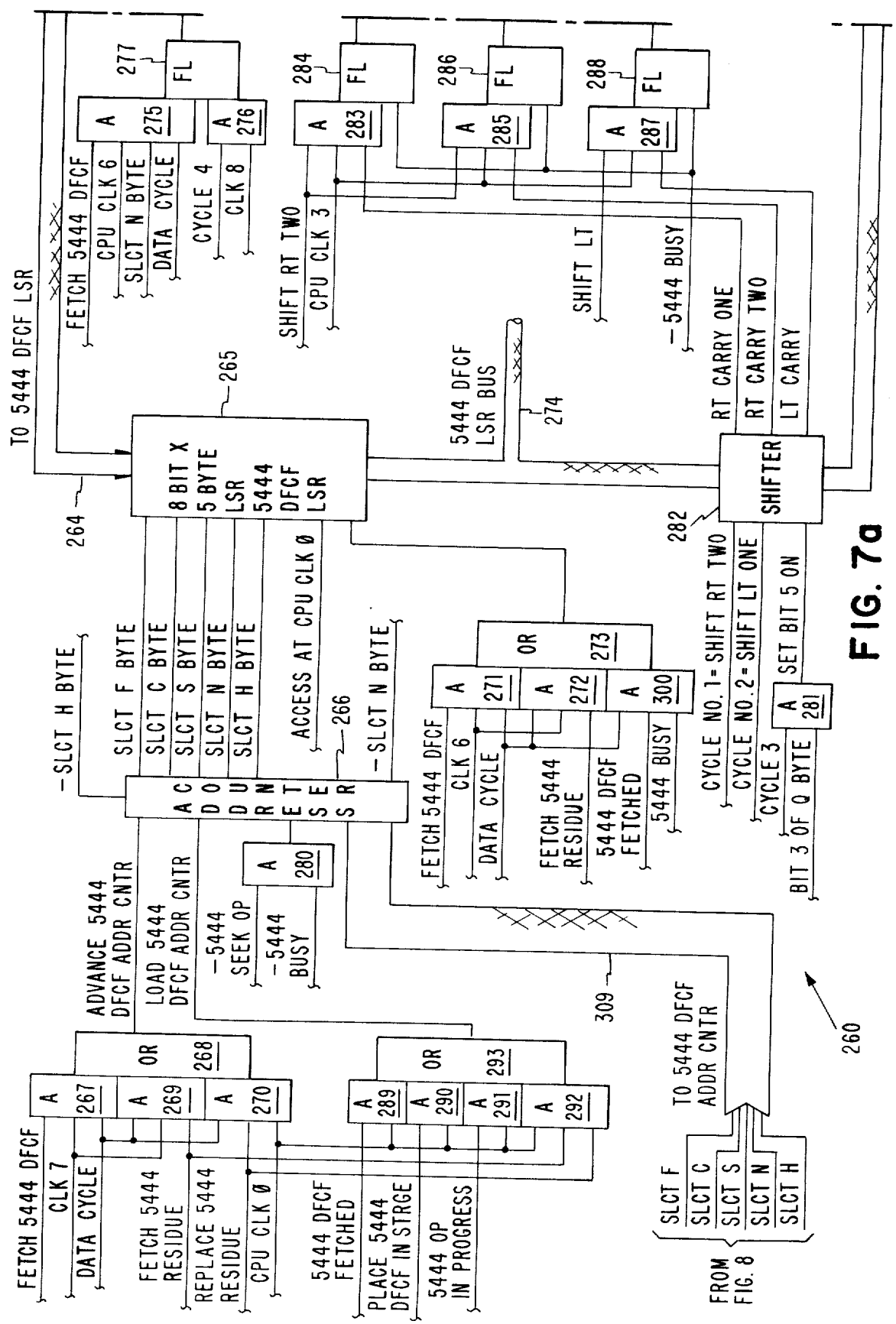
FIGS. 7a and 7b, with FIG. 7a disposed to the left of FIG. 7b, taken together are a schematic logic diagram of the conversion of 5444 control field to 5445 control field format logic in the emulator of FIG. 5.
Figure 7B:
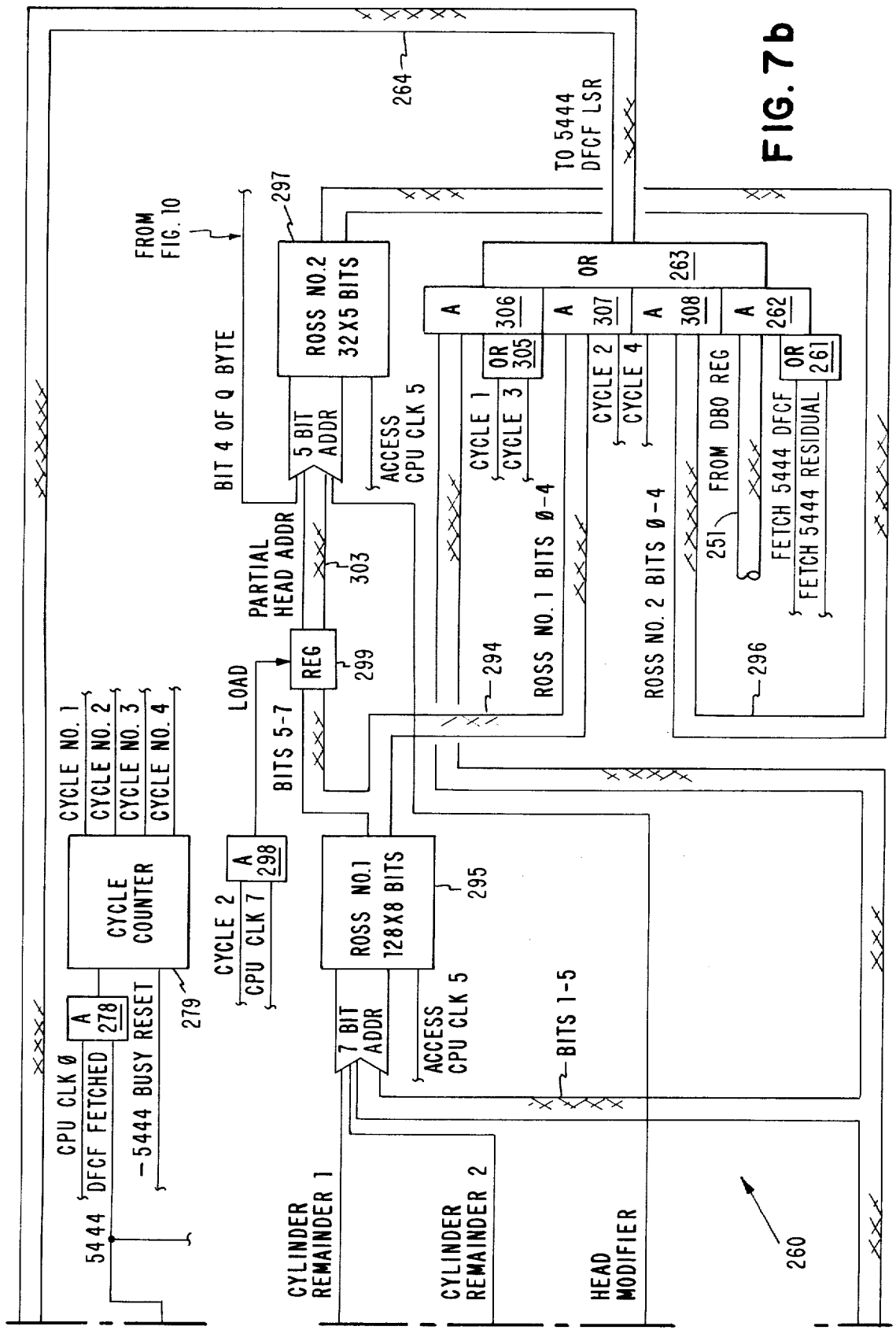

The byte of data in register 227, FIG. 10a, is transferred via emulator DBO bus 251 to AND circuit 262, FIG. 7b, of the Conversion of 5444 Control Field To 5445 Contnrol Field Format logic 260, FIG. 7. AND circuit 262 is representative of a plurality of AND circuits there being an AND circuit for each bit forming bus 251. AND circuitry 262 is conditioned by the output of OR circuit 261 which at this time is receiving a Fetch 5444 DFCF signal from latch 508, FIG. 9c.

The byte of data on bus 251 is passed by AND circuit 262 via OR circuit 263 to the 8 bit by 5 byte 5444 DFCF LSR registers 265, FIG. 7a, via bus 264. When this first byte of data is stored in register 265, a hexidecimal 01 will be sent to the CPU via DBI 55. The hexidecimal 01 is used to modify the storage address in the LSR selected by the emulator LSR select 3 and emulator LSR select 4 signals. The hexidecimal 01 signal was developed by AND circuit 441 and passed by OR circuit 443. AND circuit 441 receives a clock 4-5 signal from latch 480, FIG. 11c, a Not Issue Recalibrates signal from inverter 516, FIG. 9b, a Not Gate 5444 N byte signal from inverter 319, FIG. 8, a Not Fetch 5444 Residuals signal from inverter 417, FIG. 9a, a Not Select N byte signal from address counter 266, FIF. 7a, and a Not Select H byte signal from address counter 266. The Gate 01 to DBI signal is passed to OR circuit 472 and from there to the emulator DBI bus 501 as emulator DBI bit 7. This bit is then passed to the CPU DBE 55 via OR circuit 428.

From the foregoing it is seen that a cycle steal request was made at CPU clock 6 time and the cycle steal was granted by the CPU at clock 8 time. At the time the cycle steal request was granted, the address in the LSR was used to fetch a byte of data from main storage. The fetched byte of data was then put on the CPU DBO 25 at clock 5 time. During the miscellaneous compute period of the cycle, i.e., clocks 0 and 1, hexidecimal 00 is put on the DBI bus 55 by default because no other data is on the bus at this time. The DBI parity bit is generated by the parity generator 466 and grated by the Data Cycle signal. The DBI parity bit is transferred to the CPU via the DBI bus 55. Then during clocks 2-3 data is put onto the DBI bus 55. In this instance, hexidecimal goes onto bus 55 by default. During clocks 4-5 the LSR selected at clock 4 time is updated with hexidecimal 01 which was passed to the CPU on DBI 55. The address in the LSR in some instances is also updated by subtracting a constant from the value therein and in that instance the Binary Subtract signal from latch 458 FIG. 11c, is present during clocks 4-5.

The byte of data placed on DBI 55 at clocks 2-3 is stored under control of the Store Data To CPU signal from latch 478, FIG. 11c, which is set via AND circuit 476 at CPU clock 3 time with the signal from latch 475 which had been set at CPU clock 2 time. During CPU clocks 6-7 hexidecimal 00 is placed on DBI 55. The latch 514 is reset at CPU clocks 8 time whereby the Data Cycle signal is no longer available. This completes the first I/O cycle for a seek operation. Three similar cycles are then taken.

The byte of data fetched during the next I/O cycle for the seek operation is loaded into the LSR's 265, FIG. 7a, at the position addressed by counter 266. The control signal for loading the byte into the LSR's 265 is passed by AND circuit 271 and OR circuit 273 at clock 6 time. The address counter 266 is then advanced at clock 7 time by a signal passed by AND circuit 267 and OR circuit 268.

The second byte of data is the cylinder byte and it is examined to determine if it is greater than decimal 224. The second byte of data is decoded by circuit 520, FIG. 9c, and the output of this decode circuit is applied to AND circuit 521. AND circuit 521 is gated by CPU clock 7 and Select C byte signals. The Select C byte signal comes from address counter 266, FIG. 7a. The output of AND circuit 521, FIG. 9c, sets latch 522 and its output is applied to AND circuit 523. AND circuit 523 has inputs for receiving a bit 7 from bus 274, a Select S byte signal from counter 266 and a CPU clock 7 signal. The output of AND circuit 523 sets latch 425. The output of latch 524 is a Recalibrate signal for a recalibrate operation. This signal is applied to AND circuit 526 which also receives a CPU clock 4 signal and a 5445 not busy signal. The output of AND circuit 526 sets latch 527 and its output is a Pre Issue Recalibrate signal. The Pre Issue Recalibrate signal remains latched as the other two bytes are fetched.

To fetch the next byte, the address in the selected LSR is incremented by hexidecimal 01. The hexidecimal 01 is again generated under control of AND circuit 441 and OR circuit 443, FIG. 11a. The fetched byte of data is stored in the Address LSR 265 but is not used.

The last byte of data for this data cycle is then fetched. During this last or fourth fetch operation, the address in the selected LSR is decremented with a hexidecimal 03. The Gate hexidecimal 03 to DBI signal is passed by AND circuit 444 and OR circuit 446, FIG. 11a. AND circuit 444 receives the CPU clocks 4-5 signal from latch 480 which was set under control of AND circuit 479 and CPU clock 4 time, a select N byte signal from counter 266 and a Fetch 5444 DFCF signal from latch 508. The hexidecimal 03 restores the address in the LSR back to its original value.

The decrementing of the address in the LSR takes place under control of a Binary Subtract to CPU signal from latch 458 which is set under control of AND circuit 457. AND circuit 457 receives a signal from OR circuit 456, a Data Cycle signal from latch 514 and a CPU clock 4 signal. OR circuit 456 at this time is receiving a signal from AND circuit 450 which has inputs for receiving a Fetch 5444 DFCF signal from latch 508 and a select N byte signal from counter 266. The Fetch 5444 DFCF signal, the select N byte signal and Data Cycle signal cause latch 277 to be set at CPU clock 6 time via AND circuit 275. The output of latch 277 is a 5444 DFCF Fetch signal which is used for discontinuing the request of a cycle steal by resetting latch 508.

The latch 527 is set when the select N byte signal is available. The output of laltch 527 provides a signal for generating a Issue Recalibrate signal via AND circuit 528 which sets latch 529. AND circuit 528 receives the 5445 Not Busy signal and is gated by CPU clock 4 time. If the 5445 is not busy, latches 527 and 529 will be set at the same time or otherwise latch 527 is set and then latch 529 becomes set when the 5445 goes not busy.

During the recalibrate operation, two cycles are taken from the CPU whereby the CPU is prevented from issuing and I/O instructions. The emulator 200 will instead issue the SIO instruction. The two cycles taken from the CPU are requested under control of AND circuit 530, FIG. 9c, which receives a Recalibrate signal from latch 524, an Issue Recalibrate signal from latch 529 and a CPU clock 5 signal.

The signal from AND circuit 530 is passed by OR circuit 510 to set latch 511 and a cycle steal request is generated at clock 6 time by AND circuit 512 in the manner as previously described. The Issue Recalibrate signal from latch 529 sets latch 537 via OR circuit 536. The output of latch 537 is a SIO instruction to the 5445 signal which is passed by bus 32 to the I/O attachment 30. Latch 537 remains set as long as latch 529 is set, i.e., it remains set for the entire time of the SIO operation for the 5445.

The first cycle of operation for the 5445 is a I-Q cycle which is generated by AND circuit 542. AND circuit 542 has inputs from latch 540 and inverter 541. Latch 540 is set under control of AND circuit 539. AND circuit 539 receives the Issue Recalibrate signal via OR circuit 538 and also receives a CPU Clock 0 signal.

Inverter 541 is connected to the set output of latch 547 which is set under control of AND circuit 546. AND circuit 546 is connected to the output of latch 545 and also receives a CPU Clock 0 signal. Latch 545 is set under control of AND circuit 543 which is connected to the set output of latch 540 and receives a CPU Clock 3 signal.

During clocks 4–6 of the I-Q cycle, the Q byte is sent to the 5445 I/O attachment 30. The Q byte is formed from Q bits 3–7 of register 257 and bits 0 and 1 from AND circuits 554 and 555. Bit 2 of the byte is always 0 by default. Bits 3 and 4 are also 0 by default. AND circuits 544 and 555 are gated by a DBO Time signal from latch 553 which is set under control of AND circuit 551. AND circuit 551 receives a CPU clock 4 signal and a CPU Sample DBO signal. The AND circuits 554 and 555 as well as AND circuits 566, 557 and 560 receive the 5445 I-Q cycle signal from AND circuit 542. AND circuits 556, 557 and 560 receive Q bits 5, 6 and 7 respectively. The outputs of AND circuits 557 and 560 are applied to OR circuits 559 and 562 respectively and the outputs of AND circuits 554, 555, 556, OR circuit 559 and OR circuit 562 are applied to OR circuit 343, OR circuit 341, OR circuit 345, OR circuit 350, OR circuit 356 and OR circuit 355 respectively, FIG. 12. The outputs of these OR circuits are connected to bus 32.

The 5445 I-Q cycle is followed by a 5445 I-R cycle. This signal comes from AND circuit 548 when latches 540 and 547 are set. It will be recalled that latch 540 already had been set and latch 547 is set subsequent to the setting of latch 540 at CPU clock 0 time. The 5445 I-R cycle signal is applied to AND circuits 558 and 561 to pass bits 6 and 7 of the R-byte from register 258, FIG. 10a. The R-byte is passed to the I/O attachment 30 via bus 32 in the same manner as the Q byte.

This completes the SIO cycle of operation. An End Of SIO signal is generated by AND circuit 550 at CPU clock 0 time. Latch 549 which feeds AND circuit 550 is set by AND circuit 544 which has inputs from the set output of latch 547 and from the CPU for receiving a Clock 5 signal. The End Of SIO signal is used for resetting latches 540 and 547. It should be noted that the End Of SIO signal occurs at CPU clock 0 time, however, at clock 8 time just preceeding clock 0 time, the 5445 I-R Cycle signal resets the 5444 Seek Op latch 217, FIG. 19b, via AND circuit 216. AND circuit 216 receives the 5445 I-R Cycle signal from AND circuit 548, the CPU Sample DBO signal from the CPU and the CPU Clock 8 signal. When latch 217 is reset, the reset output thereof causes latches 522, 527 and 529, FIG. 9c, to be reset. Latch 524 was reset at CPU Clock 3 time during the 5445 I-R Cycle. With latches 524 and 529 reset, the inputs to AND circuit 530 are no longer satisfied and hence no additional cycle steals are requested. It should be noted that a normal 5444 seek operation, i.e., one not issued with a read or write or recalibrate has no effect so far as the 5445 I/O attachment 30 is concerned.

The read, write and scan operations within emulator 200 are defined as data operations. Latch 248, FIG. 10b, is set during any of the read, write or scan operations. Latch 248 is set under control of AND circuit 247 which receives the 5444 Q-R Cycle signal, the Not DBO PC (parity check) signal, the CPU I-R Cycle signal, the CPU Clock 6 signal, the Not 5444 Busy signal and the Valid Data Op signal. The set output of latch 248 causes response signals to be generated in a manner similar to the Seek Op signal from latch 217 as previously described, i.e., AND circuit 232 causes the generation of the response signals.

Latch 256, FIG. 10, is set to indicate that the 5444, i.e., the unattached I/O device is busy. Latch 256 is set under control of AND circuit 255 which is receiving the set output of latch 248, the Not Seek Busy signal from 5445 I/O attachment 30, the CPU Clock 2 signal and a signal from NOR circuit 254. NOR circuit 254 receives the CPU, TIO, SIO, LIO and SNS signals. The set output of latch 256 is used to generate four fetch cycles for fetching four bytes of data from the CPU and storing the fetched bytes of data in the LSR's 265 in the same manner as the previously described 5444 seek op, i.e., the 5444 Data Op signal sets latch 508, FIG. 9c, via OR circuit 506 and AND circuit 507. Cycle steals are then requested under control of AND circuit 512 as previously described. However, the data operation is different from the seek operation in that when Latch 277 in FIG. 7a is set after the 5444 DFCF has been fetched, four cycles are generated by counter 279 because the Not 5444 Busy Reset signal is not present, whereas during the seek operation this signal had been present.

The 5444 control field is converted to the control field format for the 5445. For this conversion, every four 5444 tracks are converted into one 5445 cylinder. This is done by dividing the 5444 cylinder byte by four, i.e., by shifting the 5444 cylinder byte right two places. The quotient is used to form the 5445 cylinder and the remainder is used to form the head and sector bytes.

Figure 16:
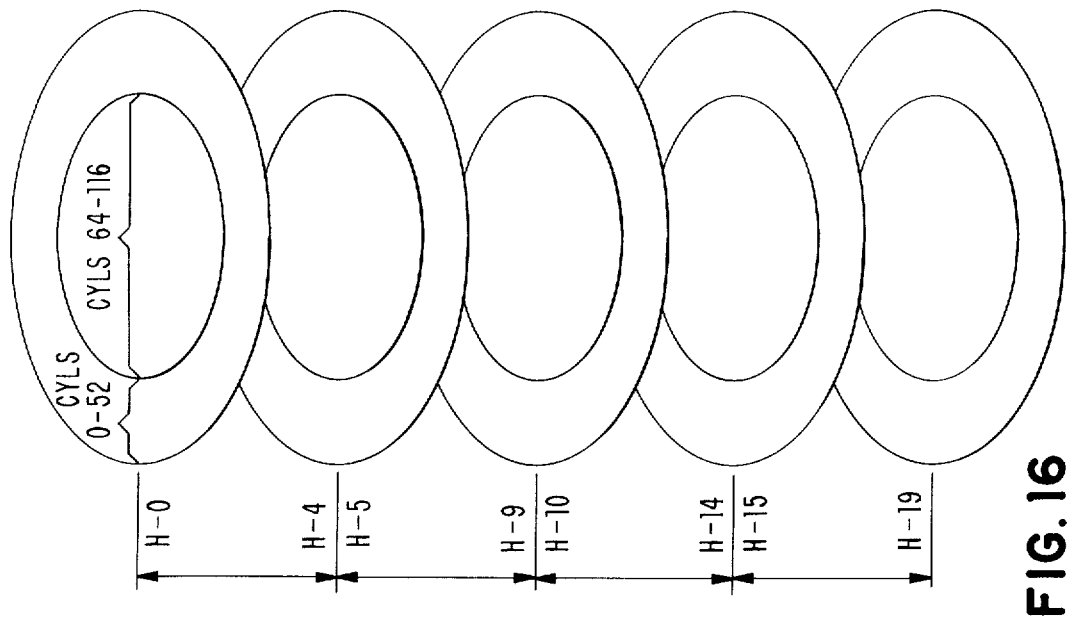
FIG. 16 is a schematic diagram illustrating the arrangement of data for an I/O disk unit not attached to the system on an I/O disk unit of a different type which is attached to the system.

If the device address specified the 5444 drive A, then the quotient from the above division is in the range of 0–52 and is used directly as the 5445 cylinder byte. If the device address specified drive B, then the above quotient is increased by 64 to be in the range of 64–116 as illustrated in FIG. 16. This modified quotient is used as the 5445 cylinder byte.

The next step is to take the remainder resulting from the division of the 5444 cylinder and formulate the 5445 sector number. This remainder is the number of tracks exceeding an even block of four 5444 cylinders and is converted to the number of sectors exceeding the even block of cylinders by multiplying by 24.

The next step is to add the number of sectors exceeding the even block of cylinders to the number of sectors specified by the 5444 sector byte. The format of the 5444 sector byte is: Bits 1–5 specify the sector and bit 0 specifies the upper or lower surface of the disk. Therefore, the binary addition of bits 1–5 of the 5444 sector byte and the number of sectors calculated above is the desired result. This result is divided by 20 to yield the number of 5445 tracks beyond the even block of 5445 cylinders derived from the first step and the remainder is the converted sector byte for the 5445.

Figure 15:
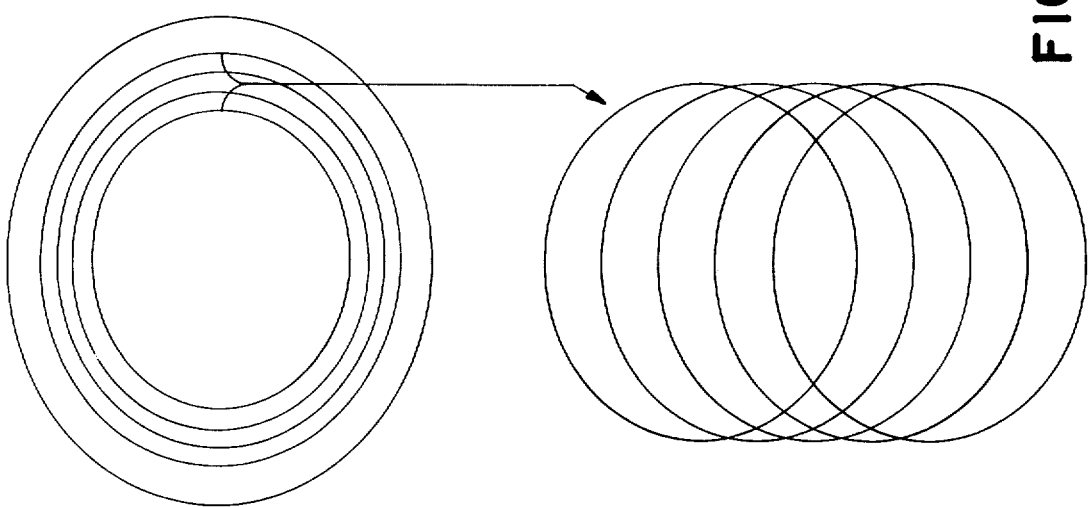
FIG. 15 is a schematic diagram illustrating the transposition of the track arrangement on one disk of the I/O disk unit not attached to the system to the track arrangement on one cylinder of an I/O disk unit attached to the system.
Figure 18A:
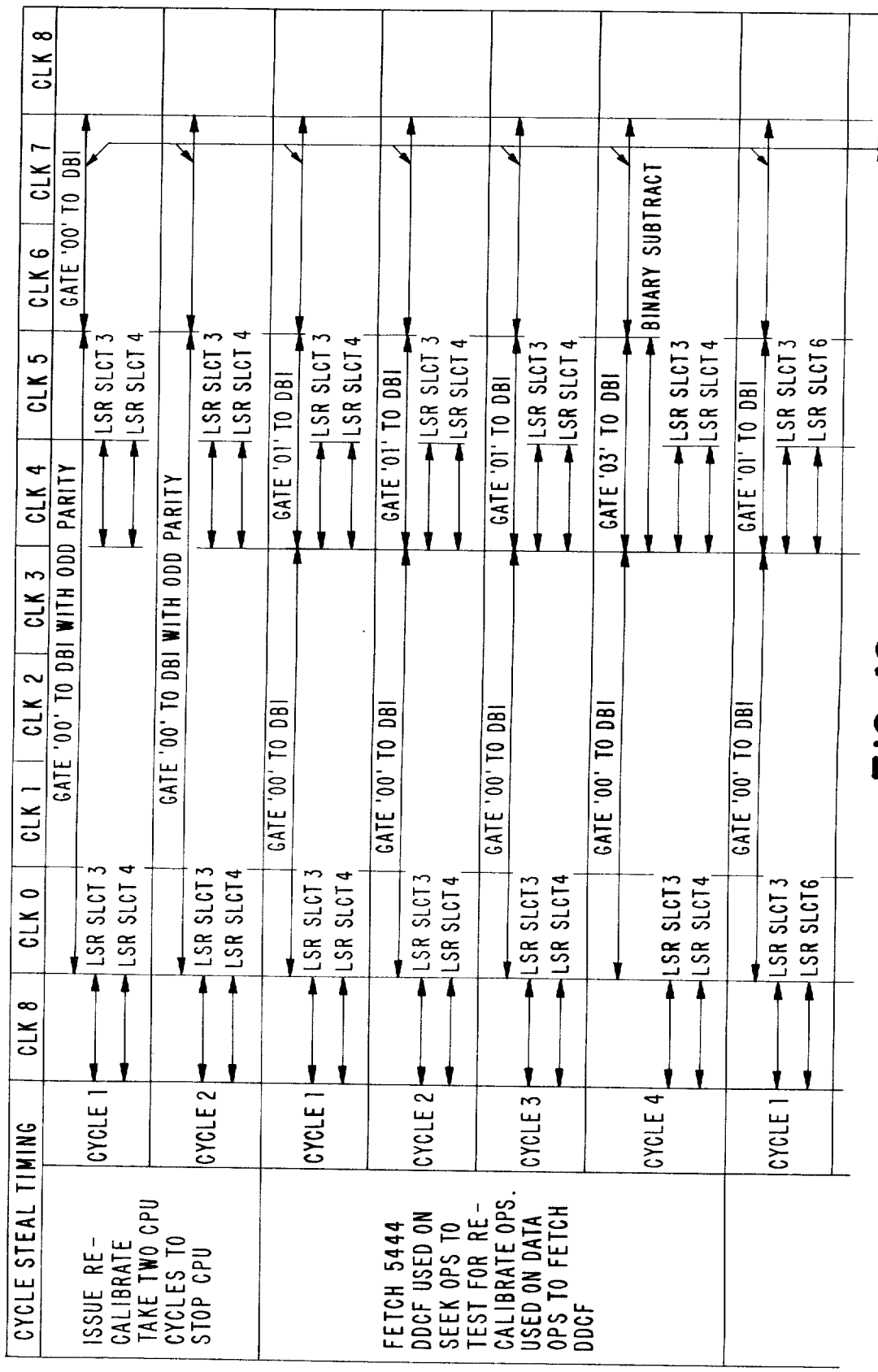
Figure 18B:
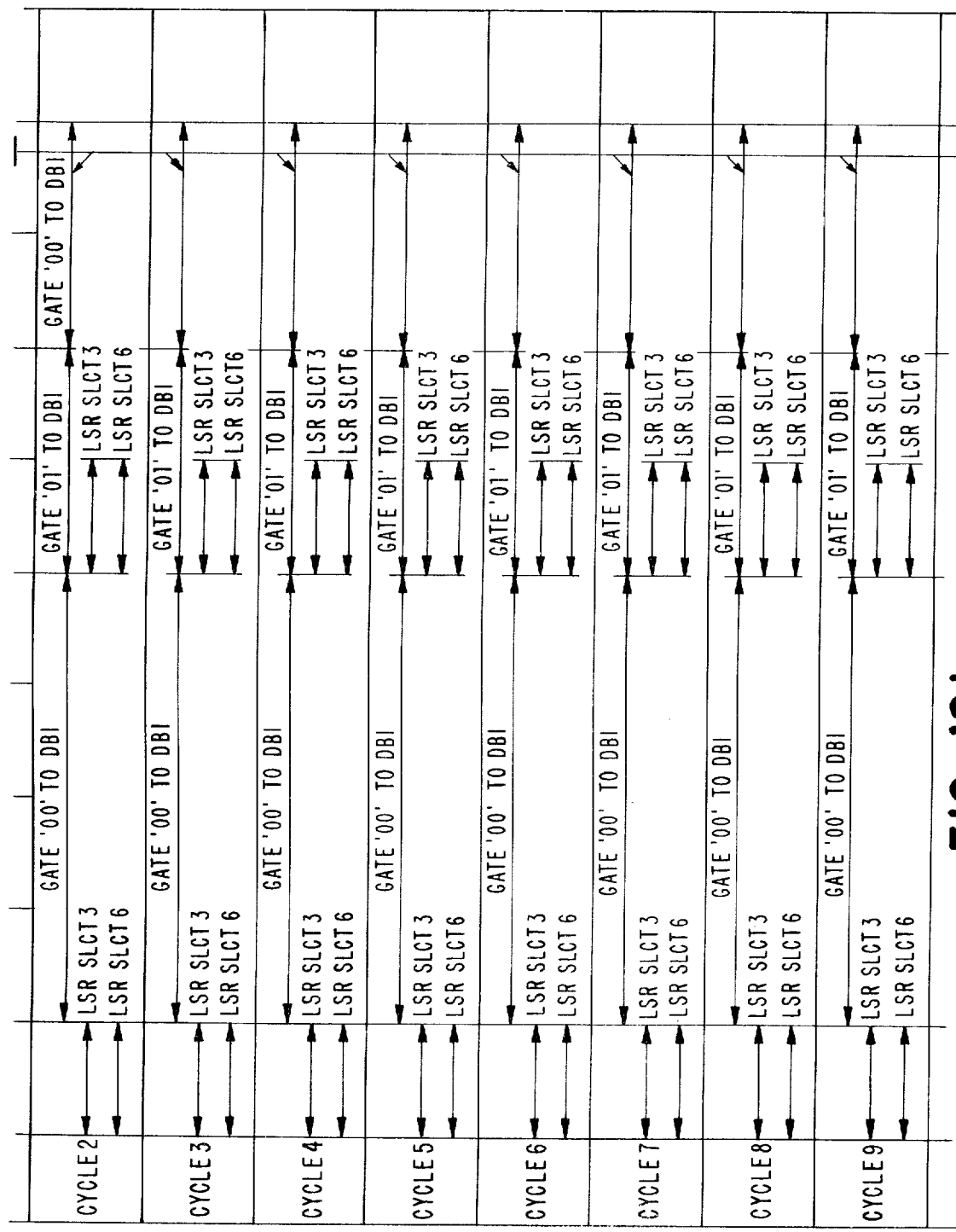
Figure 18C:
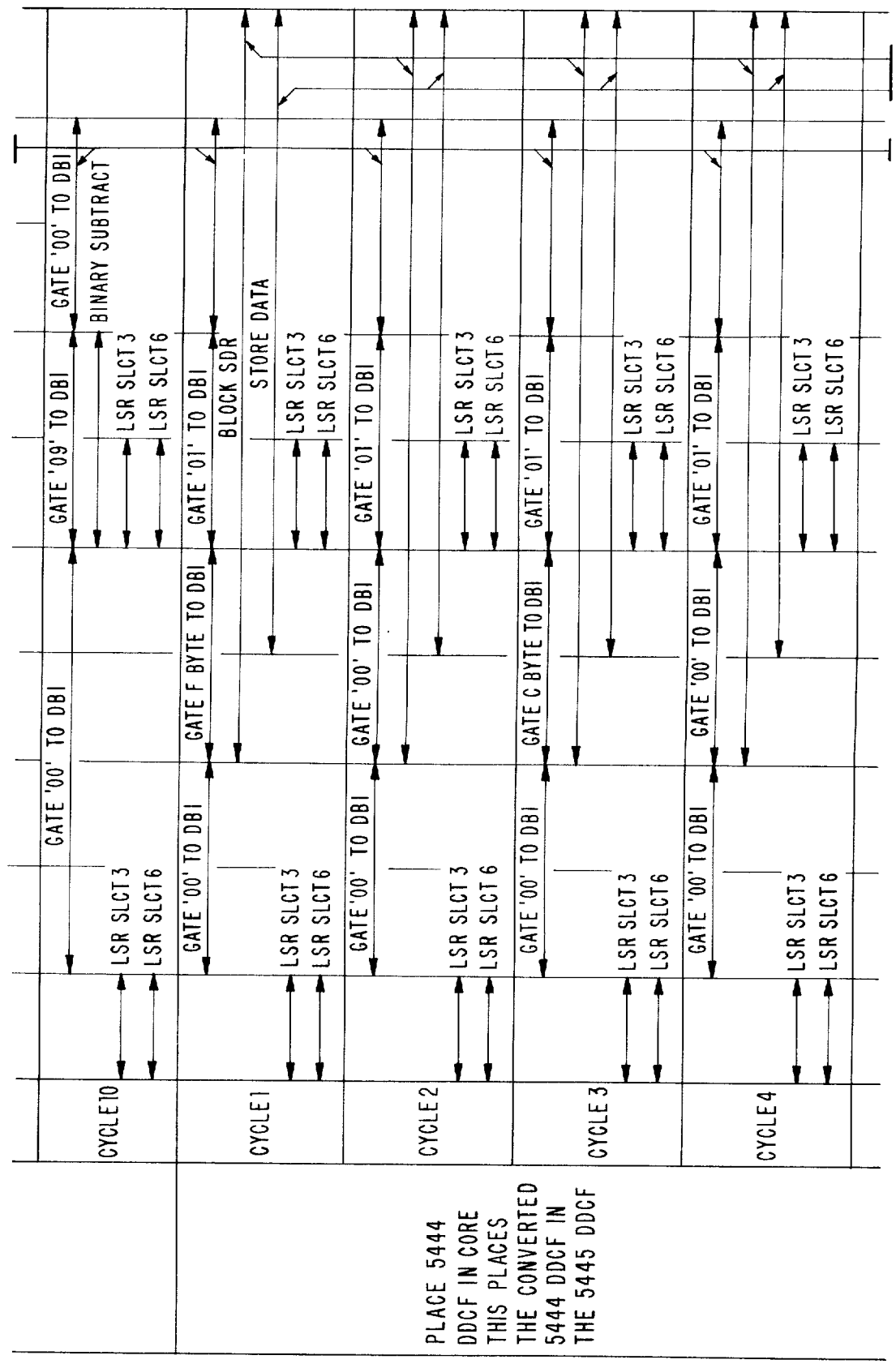
Figure 18D:
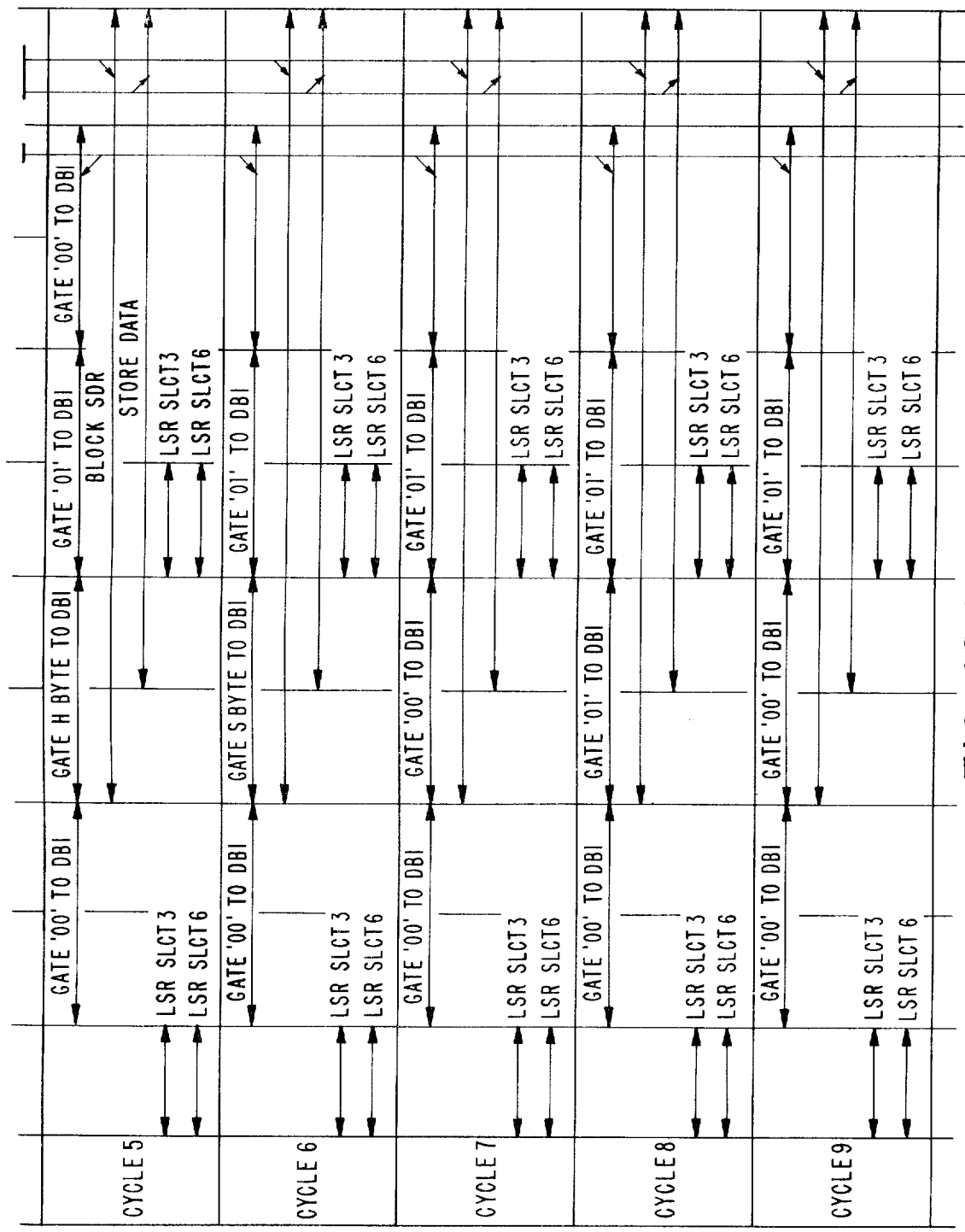
Figure 18E:
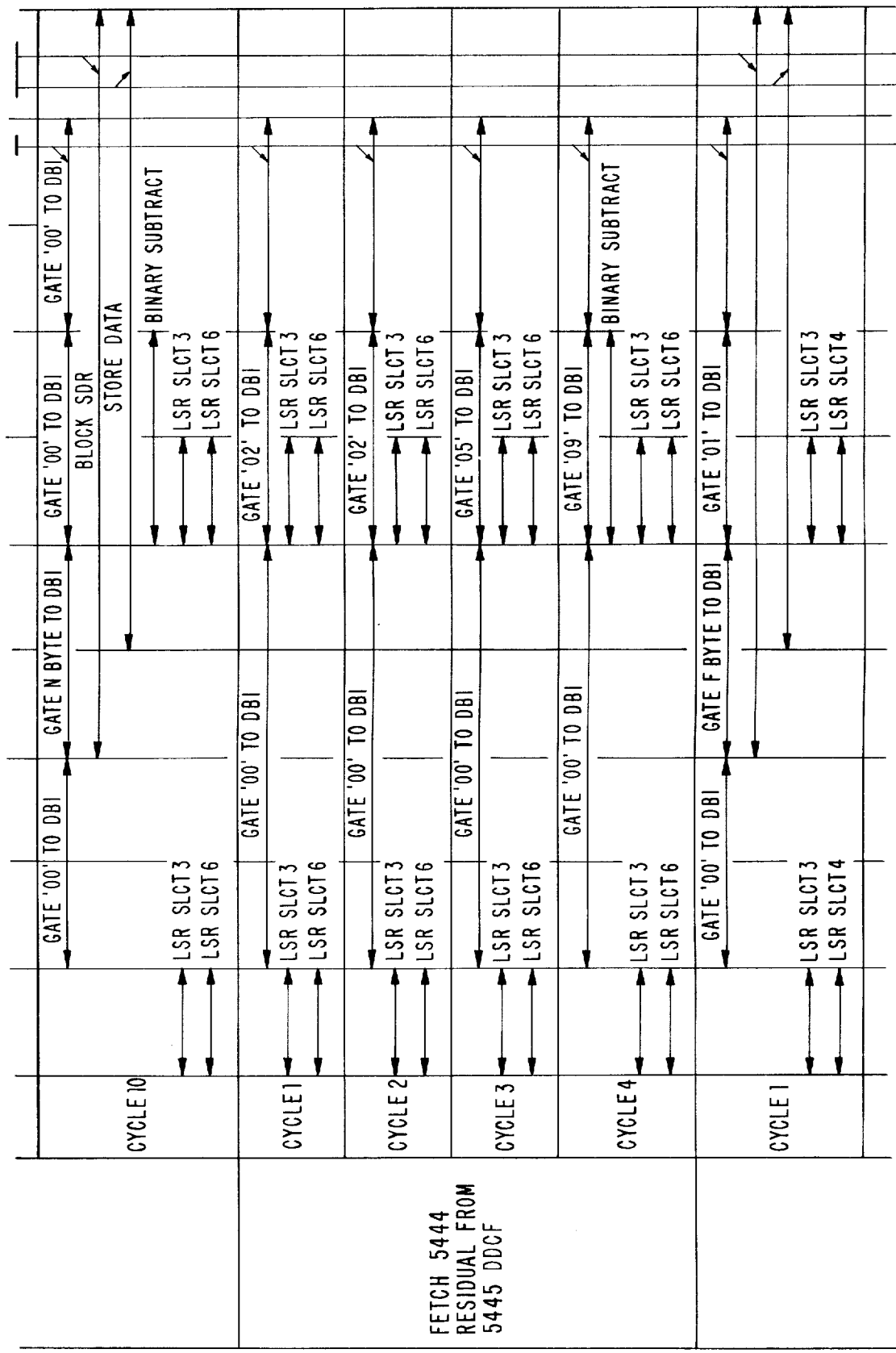
Figure 18F:
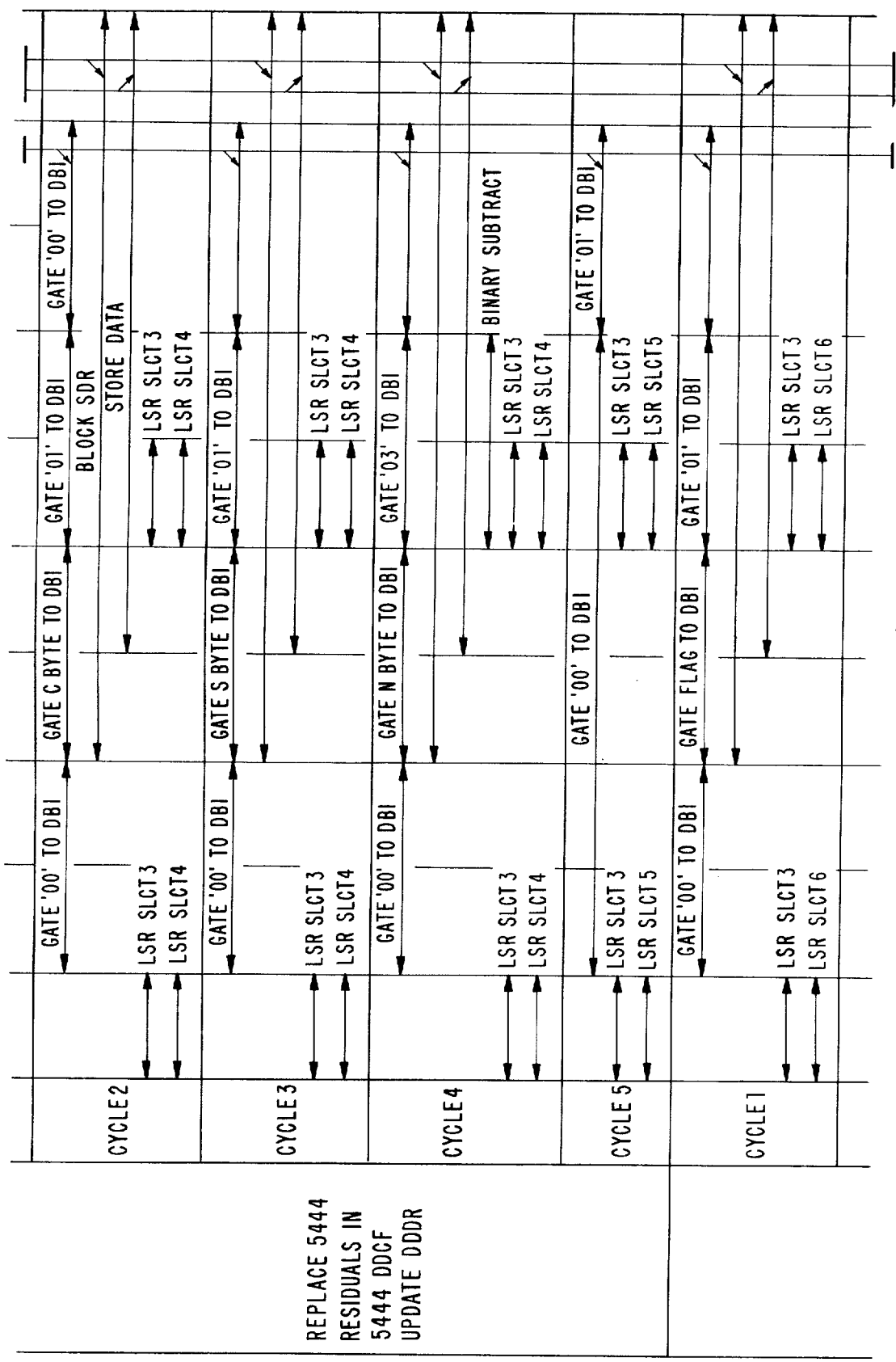
Figure 18G:
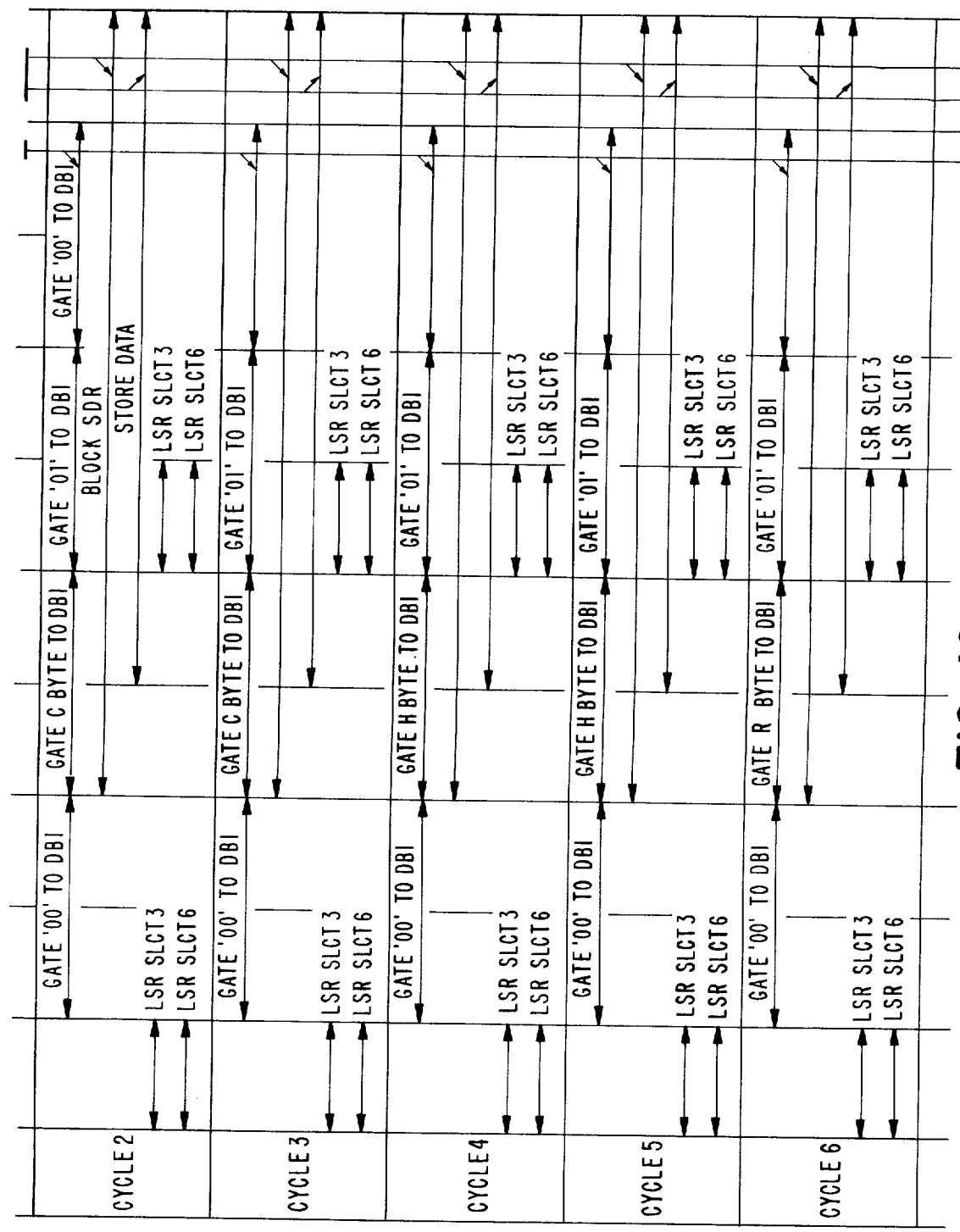
Figure 18H:
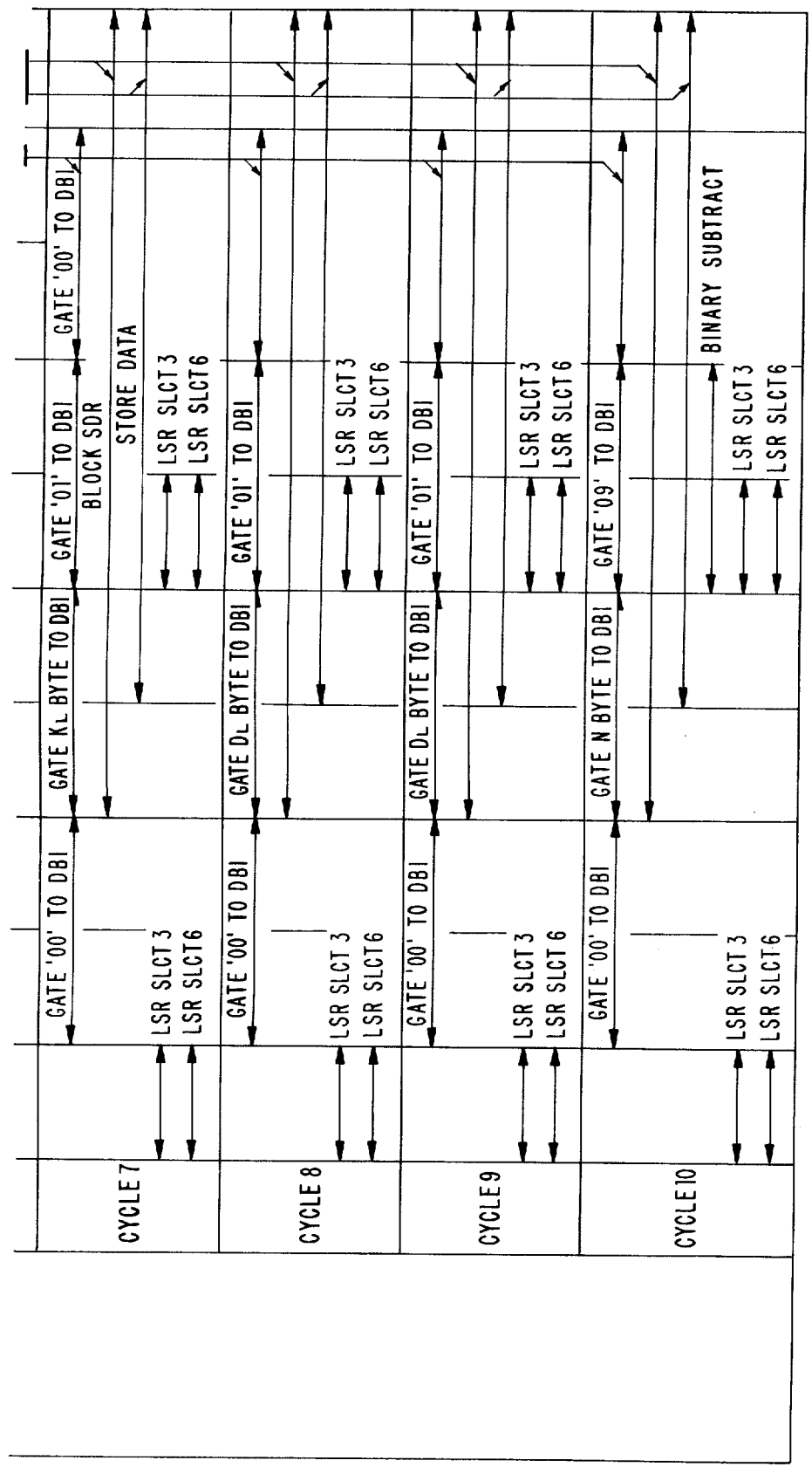

In summing the 5444 cylinder byte is divided by four and modified by the 5444 device address to obtain the 5445 cylinder. Then the remainder is multiplied by 24 and added to the 5444 sector to get the number of sectors beyond the even block of 5445 cylinders. This latter number is divided by 20 and the remainder is the 5445 sector byte. The quotient is used to formulate the 5445 head as follows:

As shown in FIG. 15, the 5445 disk pack is divided into 8 areas which represent the 8 different disk surfaces of the 5444. These 8 surfaces are:

1. 5444 disk drive A, top surface removable disk.
2. 5444 disk drive A, bottom surface removable disk.

Figures 14, 17:
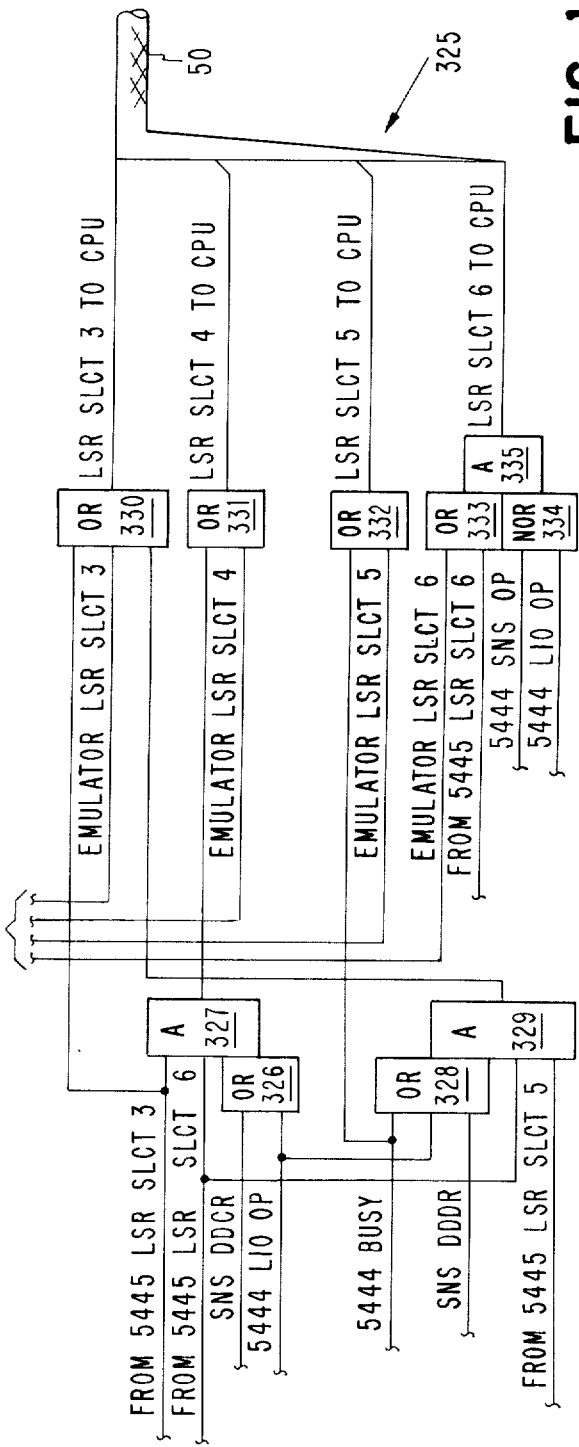
FIG. 14 is a schematic logic diagram of the LSR select logic in the emulator of FIG. 5.
FIG. 17 is a table showing the location of data in a disk storage drive attached to the system where the data is intended to be stored in a disk storage drive not attached to the system; and, FIG. 18 illustrates the arrangement of FIGS. 18a – 18h which taken together are a cycle steal timing diagram.

3. 5444 disk drive A, top surface fixed disk.
4. 5444 disk drive A, bottom surface fixed disk.
5. 5444 disk drive B, top surface removable disk.
6. 5444 disk drive B, bottom surface removable disk.
7. 5444 disk drive B, top surface fixed disk.
8. 5444 disk drive B, bottom surface fixed disk. The head number is in one of the four areas on the 5445 disk pack, i.e., H0–H4; H5–H9; H10–H14; and H–H19 as illustrated in FIGS. 16 and 17. The M bit of the Q byte indicates whether the fixed (FD) or removable disk (RD) had been specified. The head number resulting from dividing the number of sectors by 20 is always less than or equal to 5 and indicates the head within one of the four areas of the 5445 disk pack. This number is increased by 0, 5, 10 or 15 depending on the M bit and bit O of the sector byte. The flag and N-bytes are the same for both the 5445 and 5444.

The following is an example which illustrates the conversion algorithm. The following is a typical 5444 Q byte and DFCF to be converted to a 5445 DDCF. Example:

```
DEVICE ADDRESS (Q byte)   = '10111XXX'
Flag                      = '00000000'
Cylinder                  = '00001111'      5444 Q byte
Sector                    = '11011100'      and DFCF
N byte                    = '00000001'
Step No. 1   Divide cylinder by 4
             Cylinder = '00001111'
             Cylinder
             ──────── = '00000011' + Remainder of 11
                4
Step 2       Calculate Cylinder
             Resulting cylinder from step No. 1 = '00000011'
             Q-byte specifies drive B
             00000011
            +01000000   Add + 64 for specified drive
             01000011   B 5445 cylinder
Step 3       Multiply remainder of step No. 1 by 24
             24 = 11000
             11000 × 11 = 1001000
Step 4       Decode sector byte and add to result
             of step No. 3
             Sector byte = '11011100'
Bit Φ = 1    Decode of Sector = 10111
             10010000
            + 10111
             1011111    Number of sectors exceeding
                        the even block of cylinders
                        of step No. 1.
Step No. 5   Divide by 20
             20 = 10100
                           100
                   10100 ⟌1011111
                           10100
                           ─────
                            1111
             1011111
             ─────── = 100 + Remainder
              10100
             of 01111   5445 sector = 01111
Step No. 6   Calculate head
             Result head from step No. 5 = '100'
             Q-byte indicates fixed disk
             Bit Φ of sector indicates bottom surface
```

The Q-byte and sector bit-φ indicate that the area of the 5445 disk pack being used is between heads 15–19. The head from Step No. 5 is the fifth head of the group (Step No. 5 gives either 0, 1, 2, 3, or 4, therefore in this example, the fifth head is indicated). The fifth head of the group is head 19. It should be noted:

5444 DFCF = FCSN where
    F is flag byte
    C is cylinder byte
    S is sector byte
    N is N-byte 5445 DDCF - FCCHHRK$_l$D$_l$D$_l$N where
    F is flag byte
    C is cylinder high byte
    C is cylinder low byte
    H is head high byte
    H is head low byte -continued
    R is record or sector byte
    K$_l$ is key length
    D$_l$ is data length high byte
    D$_l$ is data length low byte
    N is N-byte At this point in the operation, five bytes of the 5445 DDCF have been formed. The remaining bytes of the 5445 are known constants.

The 5445 control field (DDCF) for the above example is:

| | | | |
|---|---|---|---|
| F | = | '00000000', | not changed from 5444 |
| C | = | '00000000', | always zero |
| C | = | '01000011', | from step No. 2 |
| H | = | '00000000', | always zero |
| H | = | '00010011', | step No. 6 |
| R | = | '00001111', | step No. 5 |
| K$_l$ | = | '00000000', | always zero |
| D$_l$ | = | '00000001', | always one |
| D$_l$ | = | '00000000', | always zero |
| N | = | '00000001', | not changed from 5444 |

The emulator 200 performs the above conversion in the following manner. Four steps are used, each step having four clock times.

At clock φ, the 5444 DFCF LSR's 265 are accessed to fetch the byte to be operated on.

At clock 3, the results of the shifting circuit 282 are stored in latches 284, 286 and 288 when used.

At clock 5, the ROS's 295 and 297 are accessed.

At clock 6, the 5444 DFCF LSR's 265 are loaded.

At clock 7, the address counter 266 for the LSR's 265 is loaded to point to the next byte to be operated on. Also at clock 7, the bits 5–7 of the ROS 295 are loaded into the partial head register 299 on cycle No. 2.

During step No. 1 (cycle No.1), the cylinder is fetched from LSR's 265 and divided by 4 by shifter 282 which does a shift right of two. The two carry out bits, Right carry one and Right carry two are stored as the cylinder remainders No. 1 and No. 2 in latches 286 and 288.

The cylinder data is passed by AND circuit 306 and OR circuit 263 and loaded back into the LSR's 265 at clock 6 under control of OR circuit 273.

During Step No. 2 (cycle No. 2), the sector byte is fetched from LSR's 265 and bit φ is stripped off by shifter 282 which performs a left shift of one. The left carry bit is stored in the head modifier latch 288 under control of AND circuit 287.

The modified sector bits from shifter 282 and cylinder remainder bits from latches 284 and 286 are used at clock 5 of cycle No. 2 to address ROS 295. The output of ROS 295 is the 5445 sector and unmodified head bits φ-4 are loaded back into LSR's 265 as the 5445 sector byte and the partial head bits 5–7 into register 299. ROS 295 effectively does steps 3, 4 and 5 of the conversion algorithm.

During cycle No. 3, the cylinder in LSR's 265 is fetched and bit 5 is set on by AND circuit 281 if drive B of the 5444 is addressed, i.e., bit 3 of the Q-byte from register 257 is one. This operation increases the cylinder byte by 64 whenever drive B is addressed.

During cycle No. 4, the head byte is formed. The partial head bits from register 299, bit 4 of the Q byte and the head modifier bit stored in latch 288 are concatenated together to form an address to ROS 297.

The output of ROS 297, FIG. 7b, is stored as the head byte in the LSR's 265 via AND circuit 308, OR circuit 263 and bus 264 at CPU Clock 6. Then at CPU Clock 8 time of this cycle latch 277 is reset via AND circuit 276 and the conversion, except for inserting the constants, is complete.

After the 5444 DFCF is converted to the 5445 DDCF format, the converted 5445 DDCF is placed in storage 10 so that the 5445 attachment 30 can perform the data operation. The converted DDCF is placed in storage 10 at the same location in storage 10 that the normal 5445 DDCF is stored. Therefore, the normal 5445 DDCF must be fetched from storage 10 and stored in the emulator 200 whenever the attachment 30 is emulating 5444 commands. After the data operation for the unattached I/O device is completed, the residuals remaining in the 5445 DDCF must be fetched from storage 10 and then restored in the 5444 DFCF area of storage 10. Also, the normal 5445 DDCF which was stored in the emulator 200 must be replaced in the 5445 DDCF area of storage 10.

The DDCF for the 5445 is fetched from main storage 10 by setting latch 569, FIG. 9a, under control of AND circuit 567. AND circuit 567 receives a Not 5445 Busy signal from the 5445 I/O attachment 30, a CPU Clock 4 signal and a signal from the output of latch 566. Latch 566 is set under control of AND circuit 565 which receives a CPU Clock 7 signal and the Cycle Number 4 signal from counter 279, FIG. 7b. The output of latch 569 is applied to AND circuit 531 which is gated by CPU Clock 7 to cause a cycle steal request via OR circuit 510, latch 511 and AND circuit 512, FIG. 9c. Ten cycle steals will be taken to fetch the 5445 DDCF.

Figure 8:
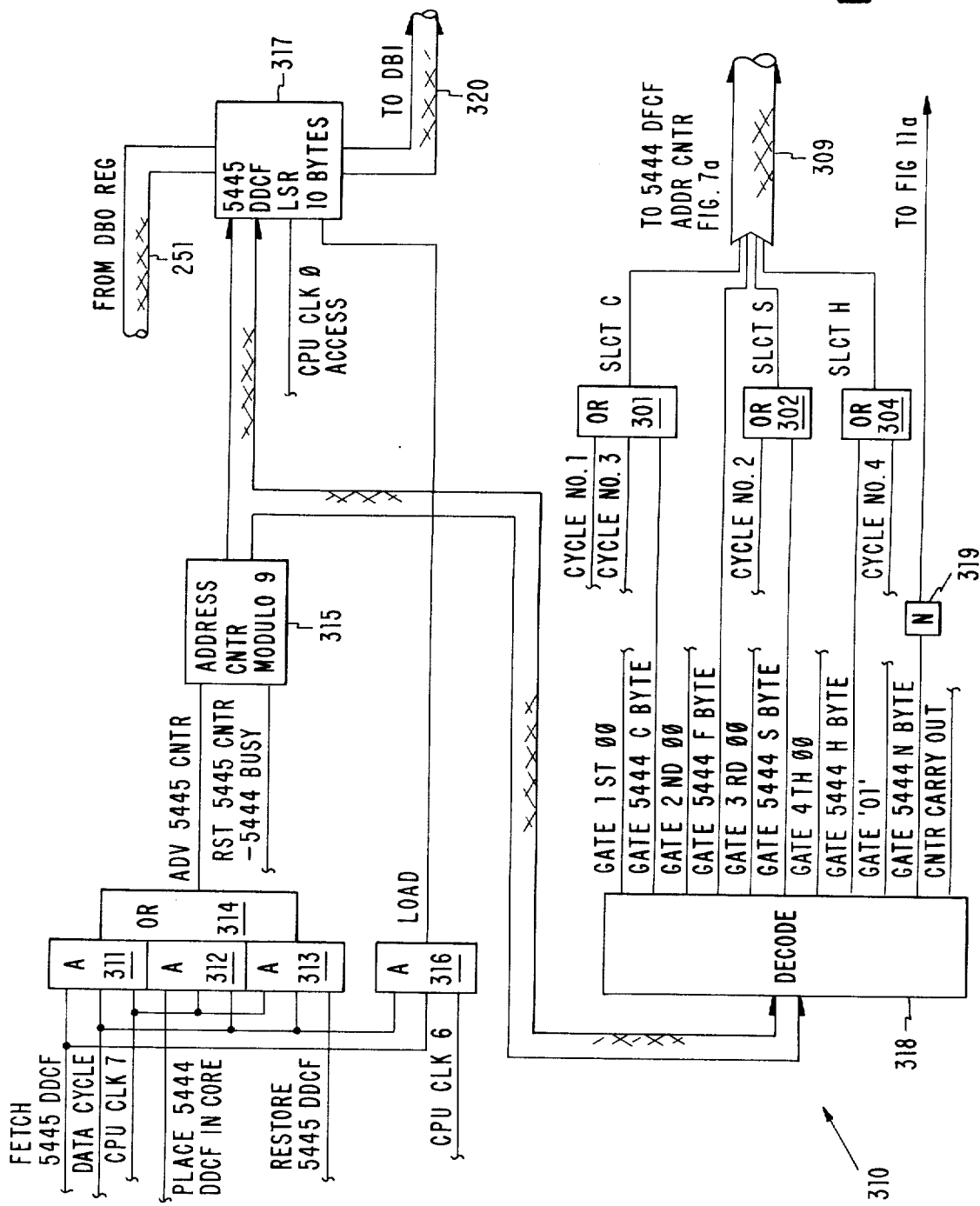
FIG. 8 is a schematic logic diagram of the store 5445 control field logic in the emulator of FIG. 5.

During the first cycle steal, the output of latch 569 conditions AND circuit 311, FIG. 8, and the output thereof is passed by OR circuit 314 to advance address counter 315 which addresses a group of LSR's 317 for storing ten bytes of the 5445 DDCF. Address counter 315 is initially reset to address the first LSR of the group of LSR's 317 and the data from main storage is transferred to the addressed LSR 317 via DBO register 227 and bus 251, FIG. 10a. The contents of address counter 315 are also decoded by circuit 318 to generate successive control signals where the first address generates Gate 5444 F-byte to DBI. The LSR in the CPU selected during this cycle steal operation is designated by the emulator LSR select bits in FIGS. 11c and 14. The Fetch 5445 DDCF signal from latch 569, FIG. 9a, is passed by OR circuit 434 and AND circuit 435, FIG. 11c, as emulator LSR select bit 6 which is passed by OR circuit 333, FIG. 14, and AND circuit 335 to bus 50 which leads to the LSR selection logic in CPU 20. Emulator LSR select bit 3 is also used for this group of ten fields and it is passed by OR circuit 430, FIG. 11c, to OR circuit 330, FIG. 14 and from there to bus 50. The operation for the first nine cycle steals is substantially the same and the lines from decode 318, except for Gate 5444 N-byte and Counter Carry Out are not used during this group of cycle steals. During the tenth cycle steal, the gate 5444 N-byte control signal is active and is used to cause the address in the 5445 LSR to be decremented by nine to its starting address. The Gate 5445 N-byte signal is applied to AND circuits 447 and 453, FIGS. 11a and 11c. AND circuit 453 sets latch 458 via OR circuit 456 and AND circuit 457. This raises the Binary Subtract line to the CPU. AND circuit 447, FIG. 11a, causes OR circuit 449 to have an output so as to gate a hexidecimal 09 to DBI 55 via the emulator bus 501 and OR circuit 428, FIG. 11b.

On the tenth advance of counter 315, FIG. 8, it returns to its starting address and decode 318 raises the Counter Carry Out line. This line is applied to AND circuit 570, FIG. 9a, to set latch 572 at CPU Clock 7 time. This same signal is also applied to AND circuit 568 to rest the Fetch 5445 DDCF latch 569 at CPU clock 8 time.

With latch 572 set another group of ten cycle steals are taken to place the converted 5444 DFCF in main storage so as to enable the 5445 I/O attachment use these bytes to control the 5445 or the attached I/O device 40. During this operation, the decode 318 of address counter 315 first provides a Gate 5444 F-byte signal to DBI. This signal from FIG. 8 is applied to bus 309 of FIG. 7a so as to set address counter 266 whereby the flag byte is fetched from LSR's 265 and transferred via bus 274 to AND circuits 483, 486, 489, 492, 495, 498, 467 and 470, FIGS. 11b and 11c. These bits are gated by the output of OR circuit 439 and passed via OR circuits 485, 488, 491, 494, 497, 500, 469 and 472 to emulator DBI 501, FIGS. 11b and 11c, and from there via OR circuit 428 to DBI 55. Data on DBI 55 is stored in main storage under control of latches 475 and 478, FIG. 11c. In this instance latch 475 is set by the signal from latch 572, FIG. 9a, which is passed by OR circuit 473 and AND circuit 474. Latch 478 is set in the same manner as previously described.

During the next cycle steal, decode 318 provides a Gate First 00 signal. This signal is not used, however, a hexidecimal 00 is placed on DBI 55 by default. This first 00 corresponds to the first cylinder byte. Decode 318 then provides a Gate 5444 C-Byte signal which is used to select the C-byte from LSR's 265 by setting address counter 266 to the appropriate address via OR circuit 301. The C-byte in LSR's 265 is placed on DBI 55 in a manner similar to the flag byte. Decode 318 then provides a Gate Second 00 signal which is not used but a hexidecimal 00 is placed on DBI 55 by default as before. This byte of hexidecimal 00 is the first head byte. The decode 318 then provides a Gate 5444 H-byte signal which is applied to OR circuit 304 to set counter 266 for selecting the head byte from LSR's 265 which is then placed on DBI 55 at the same manner as the flag byte.

Decode 318 then provides a Gate 5444 S-Byte signal which is applied to OR circuit 302 to set counter 266 to a value for selecting the S-byte from LSR's 265. The selected S-byte is placed on DBI 55 in the same manner as the flag byte. Additionally, the Gate 5444 S-Byte signal is applied to AND circuit 573 and at CPU Clock 4 time latch 574 is set because latch 572 is also set at this time. The set output of latch 574 is applied to OR circuit 538 for issuing a seek operation. The Issue Seek Operation signal from latch 574 is also applied to OR circuit 536 which sets latch 537 for sending a SIO instruction to the 5445 I/O attachment 30. A 5445 I-Q cycle and 5445 I-R cycle are generated in the same manner as described with respect to the Issue Recalibrate signal. However, in this instance, AND circuits 556, 557, 558, 560 and 561 are inhibited by the output of inverter 590. Hence, the 5445 DBO bits 5, 6 and 7 are 0.

Decode 318 then provides a Gate Third 00 signal. This signal is not used, however a hexidecimal '00' is placed on DBI 55 by default. The third hexidecimal '00' is the key length byte of the 5445 DDCF. Decode 318 then provides a gate hexidecimal '01' signal which is applied to AND circuit 440. This is the first data length byte of the 5445 DDCF. AND circuit 340 also receives the set output of latch 572 and the clock 2–3 signal from latch 460. The output of AND circuit 440 is passed by OR circuit 443 to OR circuit 472 so as to become emulator DBI bit 7. This bit forms part of the emulator DBI 501 and is passed to DBI 55. The rest of the bits forming the byte are 0 by default. The byte on DBI 55 is then stored in a manner as previously described.

The Gate Hexidecimal '01' signal also resets latch 574, FIG. 9a, and sets latch 576 via AND circuit 575. The setting of latch 576 causes latch 537, FIG. 9b, to be set whereby an SIO instruction is issued to the 5445 I/O attachment 30. The 5445 I-Q and I-R cycles are also generated in the same manner as for an Issue Recalibrate signal. Further with latch 574 reset, AND circuits 556, 557, 558, 560 and 561 are no longer inhibited and the SIO bits 5, 6 and 7 reflect the condition of bits 5, 6 and 7 of the Q and R-bytes stored in registers 257 and 258 respectively in FIG. 10a. The SIO bits are sent via bus 32 to the I/O attachment 30 in a manner as previously described.

Decode 318, FIG. 8, provides a Gate 4th 00 signal which is not used but a hexidecimal '00' is placed on DBI 55 by default and is stored as the second data length byte in main store. Decode 318 then provides a Gate 5444 N-Byte signal which supplied by bus 309 to counter 266, FIG. 7a, for selecting the N-byte from LSR's 265. The selected N-byte is placed on DBI 55. The N-byte is stored in main storage at an address taken from the selected LSR which had been incremented in the usual manner. However, the Gate 5444 N-Byte signal raises the Binary Subtract line by setting latch 458, FIG. 11c, and develops at clocks 4–5 time the Gate Hexidecimal 09 To DBI signal via AND circuit 447, OR circuit 449 and OR circuit 497 whereby the contents of the selected LSR are decremented by hexidecimal 09 to the starting value.

Decode 318 then provides a Counter Carry Out signal as address counter 315 is incremented to its starting address. This time the Counter Carry Out signal will set latch 478, FIG. 9a, at CPU clock 7 time under control of AND circuit 577 because latch 572 is still set. Latch 572 is then reset under control of AND circuit 571 at CPU clock 8 time. The set output of latch 578 indicates that a 5444 operation is in progress. The output of latch 578 sets latch 581 under control of AND circuit 579 which also receives a 5445 Not Busy signal from the I/O attachement 30 and a CPU clock 4 signal. The 5445 not busy signal is sent via I/O attachment 30 when it has completed the data operation, i.e., a read, write or a scan.

During the foregoing data operation, the 5445 I/O attachment 30 has modified certain bytes of the 5445 DDCF and the modified bytes not reside in main storage 10. These modified bytes are called residuals and are the cylinder head, low sector and N-bytes of the 5445 DDCF. These residuals must be moved from the 5445 DDCF in storage to the 5444 DDCF area in storage.

The output of latch 581 is used for generating four cycle steals by conditioning AND circuit 533. These four cycle steals for selecting the four residual bytes are reguested and granted in the same manner as previously described. The byte selected out of main storage is set into the LSR's 265 under control of address counter 266 which is incremented under control of AND circuit 269. When address counter 266 is incremented after the fourth byte has been placed in LSR's 265, the Select H-Byte 1 signal from decode 266, FIG. 7a, is active and it causes latch 584, FIG. 9a, to be set at CPU Clock 7 time under control of AND circuit 582. It also causes latch 581 to be reset at CPU Clock 8 time under control of AND circuit 580. Four cycle steals are then taken to transfer the bytes in LSR's 265 into the 5444 DFCF area of main storage 10. A fifth cycle steal is then taken to update the address in the LSR for the 5444 DFDR. The cycle steals are initiated under control of latch 584 which provides a signal to AND circuit 534 which is passed by OR circuit 510 to set latch 511.

During the first cycle steal, address counter 266, FIG. 7a, addresses the F-byte in LSR's 265 and it is placed on DBI 55 via bus 274. This byte of data is stored at a location in storage selected by the address in the LSR's selected by OR circuit 430 and AND circuit 432, FIG. 11c. OR circuit 430 has an output because the Select LSR line is active. AND circuit 432 has an output because latch 584, FIG. 9a, is providing a replace 5444 residuals signal to OR circuit 431 and inverter 502, FIG. 11c, provides a signal at an up level at this time because the output of AND circuit 433 is at a down level, even though latch 584 is providing a signal to AND circuit 433. This is because the Select H-Byte signal is not available at this time from counter 266.

The outputs of OR circuit 430 and AND circuit 432 provide LSR Select 3 and LSR Select 4 bits to bus 50 via OR circuits 330 and 331, FIG. 14. The other LSR select bits are 0 at this time. After the flag byte has been placed in main storage 10, counter 226 FIG. 7a, is incremented whereby the cylinder byte in LSR's 265 is selected. The address in the selected LSR is incremented by gating a hexidecimal 01 to DBI under control of AND circuit 441 and OR circuit 443.

Thus, the cylinder byte is stored in main storage at the proper location. The sector byte is similarly stored after address counter 266 has been incremented and the sector byte has been placed on DBI 55. The N-byte is then transferred to main storage and the Select N-Byte signal from address counter 266 causes latch 458 to be set under control of AND circuit 452 via OR circuit 456. Also, a hexidecimal 03 is gated to DBI under control of AND circuit 445. This restores the contents of the selected LSR to its original value.

During the fifth cycle steal, the Select H-Byte signal is available from address counter 266 and it is used to update the 5444 DFDR by conditioning AND circuit 442 and thereby gating a hexidecimal 01 to the DBI 55. This effectively adds 256 to the address in the selected LSR. The LSR selected at this time is the one selected by LSR select 3 and select 5 bits which are applied to bus 50. The LSR select 3 bit comes from OR circuit 330, FIG. 14, which receives a signal from OR circuit 430, FIG. 11c. The LSR select 5 bit comes from OR circuit 332 which receives a signal from AND circuit 443. AND circuit 443 is conditioned at this time by the signals from latch 584, FIG. 9a, and counter 266. Latch 587 is set at CPU Clock 7 time under control of AND circuit 585 which received the Select H-Byte signal from counter 266, a signal from inverter 517, a CPU Sample DBO signal and a signal from latch 584. Latch 584 is then reset at CPU Clock 8 time under control of AND circuit 583.

Latch 587 sets up the operation for restoring the 5445 disk drive control field DDCF. Ten cycle steals are needed to restore the bytes forming the 5445

DDCF. The cycle steals are initiated under control of AND circuit 535 which is conditioned by the Not Gate 5444 N-Byte signal from inverter 319, FIG. 8. The signal from AND circuit 535, FIG. 9c, is passed by OR circuit 510 set latch 511 and a cycle steal request is initiated by AND circuit 512 in the manner as previously described. In addition to initiating a cycle steal request, a signal from latch 587, FIG. 9a, conditions AND circuit 513, FIG. 8, whereby at CPU Clock 7 time and with Data Cycle present, a signal is passed for advancing counter 315. However counter 315 addressed LSR's 317 for fetching the first byte to be transferred to main storage from LSR's 317. The first byte is placed on bus 320 and is available at AND circuits 484, 487, 490, 493, 496, 499, 468 and 471. These AND circuits are conditioned by the Restore 5445 DDCF signal from latch 487, FIG. 9a. These AND circuits then pass the bit signals via OR circuits 485, 488, 491, 484, 497, 500, 469 and 472 respectively, to emulator DBI bus 501, FIG. 11c. The bits then are transferred via OR circuit 428 to DBI bus 55. The bits forming this first byte which is now on DBI bus 55 are loaded into main storage under control of the signal from latch 587, FIG. 9a, which is passed by OR circuit 473 and AND circuit 474 to set latch 475, FIG. 11a. Latch 475 as previously described provides a signal for setting latch 478 to develop a signal for storing the data in main storage 10. The data is stored at the address taken from the selected LSR in the CPU. The CPU LSR's are selected by emulator LSR select bits 3 and 6 from OR circuit 430 and AND circuit 435 respectively. These selection bits are placed onto bus 50 via OR circuit 330 and AND circuit 335, FIG. 14, respectively.

Successive bytes from LSR's 317, FIG. 8, are transferred as address counter 315 is incremented under control of AND circuit 313. When the tenth byte is being transferred, it is necessary to restore the address in the selected CPU LSR to its original value. This is accomplished by setting latch 458, FIG. 11a, under control of AND circuit 455 via OR circuit 456 and AND circuit 457. The output of latch 458 is the Binary Subtract signal which is transferred to the CPU. A hexidecimal 09 is gated to DBI 55 as decode 318 furnishes a Gate 5444 N-Bye signal to AND circuit 447 at clocks 4–5 time. This signal is passed by OR circuit 499 and as previously described develops emulator bits 4 and 7 via OR circuits 497 and 492 respectively. The emulator bits 4 and 7 are then transferred by emulator DBI 501 to DBI 55 via OR circuit 428. DBI 55 transfers the bits to the CPU which by means of its ALU combines them with the bits in the selected CPU LSR whereby the contents of this selected CPU LSR are modified and restored to the original value. Then at CPU Clock 8 time during this cycle, latch 587 is reset under control of AND circuit 586. AND circuit 586 also passes a Reset Busy signal for resetting latches 248 and 256. No additional cycle steals were requested after the Gate 5444 N-byte signal was made available by decode 318, FIG. 8. Further latches 475 and 478 for controlling the transfer of data to main storage 10 are reset at the next CPU clock 0 time. This completes the data operation.

From the foregoing it is seen that the invention enables a computer system to execute instructions for one type of I/O device and cause a different type of I/O device to respond. In one instance, it is seen that the emulation of the I/O device not forming part of the computer system takes place within the central processing unit. In another instance, it is seen that the emulation takes place remote of the central processing unit. It seen that the invention enables an I/O device to be operated by programs intended to and not intended to operate that I/O device. Further, as distinguished from other types of emulators, it is seen that in this invention, the emulation takes place after an instruction has been executed.

What is claimed is:

1. In a computer system includingn a main storage, a central processing unit connected to said main storage, at least one I/O attachment device connected to said central processing unit, and an I/O device connected to said I/O attachment device, said main storage storing sequences of instructions for operating an I/O device other than said I/O device connected to said I/O attachment device, the improvement comprising a quasi I/O attachment connected to said central processing unit and responsive to instructions for operating said other I/O device for generating a control signal, and means within said central processing unit responsive to said control signal for issuing control signals to said I/O attachment device to control the operation of said I/O device connected thereto according to the instructions for operating said other I/O device.

2. The computer system of claim 1 wherein said means within said central processing unit for issuing control signals to said I/O attachment device analyzes the instructions for operating said other I/O device and generates corresponding control signals to control said I/O device connected to said I/O attachment device.

3. The computer system of claim 1 wherein said quasi attachment includes means for determining the validity of an instruction transferred from said central processing unit.

4. The computer system of claim 1 wherein said quasi attachment includes means for indicating that said other I/O device when addressed by said central processing unit is present.

5. The computer system of claim 1 wherein said quasi attachment includes means for generating a parity error condition.

6. The computer system of claim 2 wherein said means within said central processing unit for issuing control signals to said I/O attachment device analyzes the instructions for operating said other I/O device to determine if an instruction is a start I/O instruction.

7. The computer system of claim 6 further comprising means responsive to said means within said central processing unit determining that said instruction is a start I/O instruction to generate a signal to initiate a test to determine if said I/O device connected to said I/O attachment device is busy.

8. In a computer system including a main storage, a central processing unit connected to said main storage, an I/O attachment device, and an I/O device connected to said I/O attachment device, said main storage storing instructions for operating an I/O device other than said I/O device, the improvement comprising an emulator connected to said central processing unit and said I/O attachment device and responsive to signals from said central processing unit developed upon executing instructions fetched from said main storage for operating said other I/O device to generate corresponding signals for operating said I/O device connected to said I/O attachment device, and means for applying said corresponding signals to said I/O attachment device.

9. The computer system of claim 8 wherein said emulator includes instruction identification means for generating signals identifying the type of I/O instruction executed by said central processing unit.

10. The computer system of claim 9 wherein said emulator further includes means responsive to signals from said instruction identification means for generating an operation in progress signal indicating that said other I/O device is operating whereby said I/O device connected to said I/O attachment device is prevented from being operated by instructions other than instructions for said other I/O device.

11. The computer system of claim 10 wherein said emulator further includes means responsive to said operation in progress signal for enabling the generation of commands for operating said I/O device connected to said I/O attachment device.

12. The computer system of claim 10 wherein said emulator further includes conversion enabling means responsive to said operation in progress signal for enabling conversion of status data of said I/O device connected to said I/O attachment device to status data of said other I/O device, and means responsive to said conversion enabling means for converting status data of said I/O device connected to said I/O attachment device to status data of said other I/O device.

13. The computer system of claim 12 further comprising means for storing said converted status data of said other I/O device in said main storage.

14. The computer system of claim 8 wherein status data of said I/O device connected to said I/O attachment device is preserved prior to said I/O device connected to said I/O attachment device responding to an instruction for operating said other I/O device and restoring said status data of said I/O device connected to said I/O attachment device after said I/O device connected to said I/O attachment device has responded to an instruction for operating said other I/O device.

15. The computer system of claim 8 wherein instructions for operating said I/O device connected to said I/O attachment device are passed to said I/O attachment device without alteration.

16. The computer system of claim 8 wherein said central processing unit completes the execution of an instruction fetched from main storage for operating said other I/O device prior to said emulator responding to said signals from said central processing unit.

17. In a computer system including a main storage and a central processing unit connected to said main storage, the improvement comprising a first I/O attachment means connected to said central processing unit and responsive to signals therefrom as said central processing unit executes I/O instructions for operating a first type of I/O device to generate signals for operating a second type of I/O device, a second I/O attachment means connected to said first attachment means and responsive to signals for operating said second type of I/O device, and a second type of I/O device connected to said second I/O attachment means whereby when said central processing unit executes an instruction for said first type of I/O device, said first I/O attachment means generates signals to operate said second type of I/O device and said generated signals for operating said second type of I/O device are passed by said first I/O attachment means to said second I/O attachment means to control the operation of said second type I/O device.

* * * * *